United States Patent [19]
Sato et al.

[11] Patent Number: 5,721,975
[45] Date of Patent: Feb. 24, 1998

[54] CAMERA INCLUDING MEANS FOR CONTROLLING CAMERA SETTINGS AS A FUNCTION OF FILM CURL

[75] Inventors: Tatsuya Sato, Hachioji; Tamotsu Koiwai, Akiruno; Yasuo Asakura, Hachioji; Yoji Watanabe, Fuchu, all of Japan

[73] Assignee: Olympus Optical Co., Ltd., Tokyo, Japan

[21] Appl. No.: 657,805

[22] Filed: May 31, 1996

[30] Foreign Application Priority Data

Jun. 1, 1995 [JP] Japan .................................. 7-134882

[51] Int. Cl.[6] .......................... G03B 3/00; G03B 13/18; G03B 13/32; G03B 17/00
[52] U.S. Cl. .................................. 396/89; 396/440
[58] Field of Search .......................... 354/203, 400, 354/409; 396/89, 97, 104, 207, 210, 213, 440, 441, 442

[56] References Cited

U.S. PATENT DOCUMENTS

| | | | |
|---|---|---|---|
| 4,307,953 | 12/1981 | Yamamoto et al. | 354/238 |
| 4,647,176 | 3/1987 | Shimizu et al. | 354/475 |
| 4,751,536 | 6/1988 | Ohmura et al. | 354/75 |
| 5,251,840 | 10/1993 | Niedospial | 242/71.1 |
| 5,325,144 | 6/1994 | Yoshikawa et al. | 354/319 |
| 5,398,091 | 3/1995 | Hershberger | 354/203 |
| 5,489,957 | 2/1996 | Weaver | 354/173.11 |
| 5,555,045 | 9/1996 | Tsujimoto et al. | 354/106 |

FOREIGN PATENT DOCUMENTS 5-45801  2/1993  Japan.

OTHER PUBLICATIONS

Olympus Superzoom70 instruction manual, p. 4., Aug. 1993.

*Primary Examiner*—Safet Metjahic
*Assistant Examiner*—Christopher E. Mahoney
*Attorney, Agent, or Firm*—Louis Weinstein

[57] ABSTRACT

In a camera using a film cartridge that holds a film with a load exerted on the film in the direction of the width of the film, a time counting block for time counting at each predetermined action of the camera, a time information memory block for storing the time from the time counting block, a film feed condition determining block for determining the condition of film feed, a time information determining block for computing a film hold time based on the latest time counted by the time counting block and the time stored in the time information memory block, and a camera setting update block for updating the camera setting according to the hold time to compensate for film curling.

30 Claims, 21 Drawing Sheets

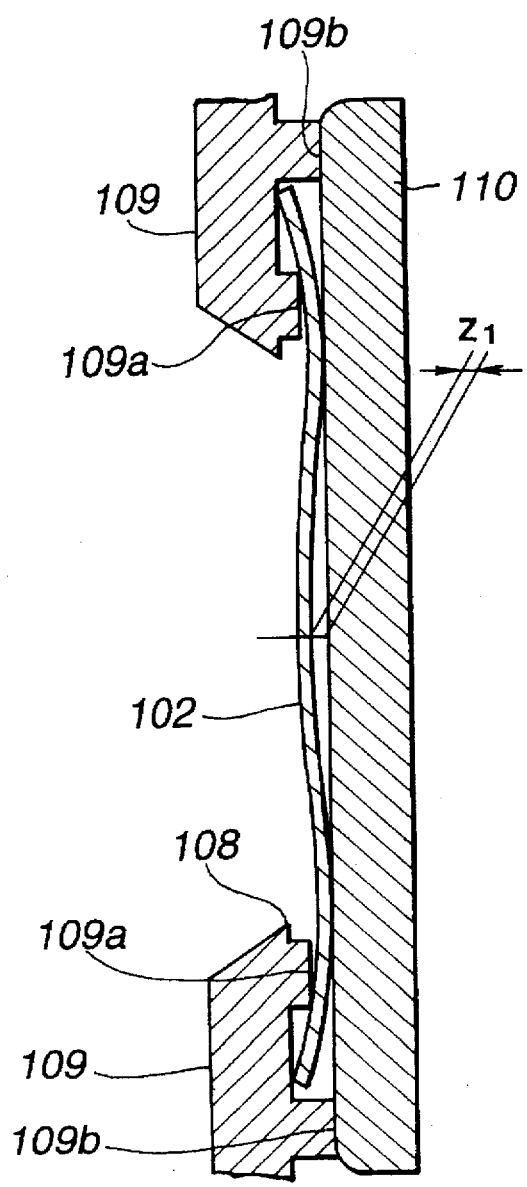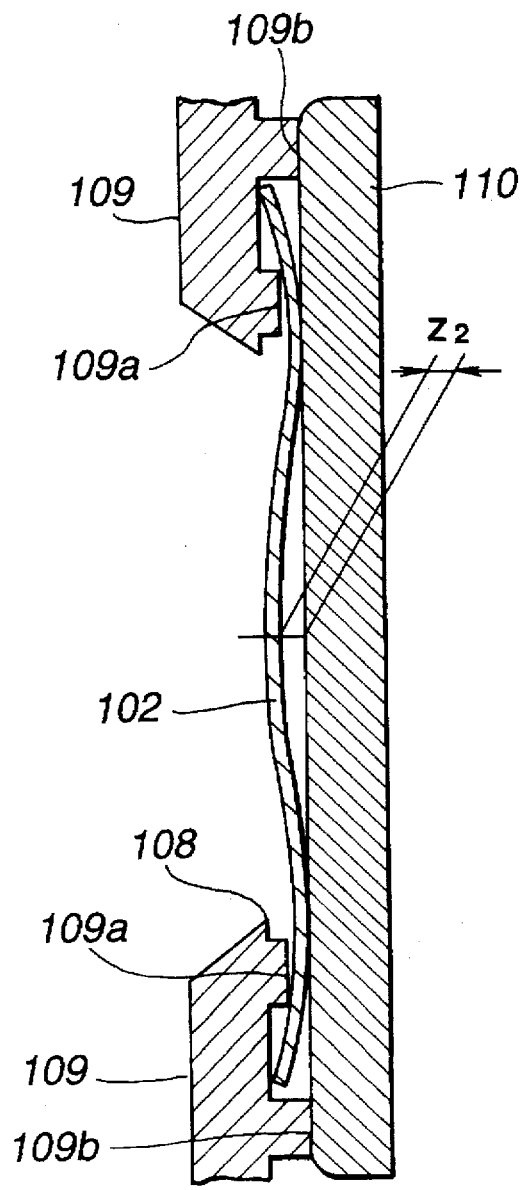
FIG.24A RELATED ART
FIG.24B RELATED ART

CAMERA INCLUDING MEANS FOR CONTROLLING CAMERA SETTINGS AS A FUNCTION OF FILM CURL

BACKGROUND OF THE INVENTION

1. Field of the Invention

The present invention relates to a camera using a cartridge, in which a lip-like projection is formed on each flange provided at each end of the spool in the cartridge, the lip-like projections partly wrap up, on both ends, the photographic film wound up around the spool to prevent loose winding, and the film is paid out into a camera body by rotating the spool in the cartridge in the direction of paying out.

2. Related Art Statement

In the photographic film cartridges disclosed in U.S. Pat. No. 5,251,840 and Japanese Laid-open Patent Application No. Hei-5-45801, flanges made of a flexible material are attached on both ends of the spool around which a film is wound in the cartridge, and a lip-like projection that is integrally formed with the periphery of each flange partly wraps from each end of the film wound around the spool so that the photographic film is prevented from loosening. In this arrangement, when the spool in the cartridge is rotated in the direction of paying out, the photographic film rotates integrally with the spool without any loosening. The above projections are widened in the direction of the width of the photographic film in the vicinity of the inlet/outlet port provided on the cartridge body, and the photographic film is guided out through the projections toward the inlet/outlet port so that the photographic film is paid out.

FIG. 22 shows the condition of the film when the cartridge is loaded into a camera. As shown in FIG. 22, the film 102, in its wound state around a spool 103, is accommodated in a cartridge case 101. Flanges 105, 106, constructed of a flexible material, are attached, with some degree of play, to both ends of the spool 103 in the cartridge, and ring-like projections 105a, 106a are integrally formed with the flanges 105, 106 circularly around them, respectively, so that the film 102 may not be loosely wound up. The film 102 paid out into the camera from within the cartridge passes behind a camera exposure opening 108 and is then wound around a spool 107 in the camera. The flanges 105b, 106b are widened apart from each other in elastic deformation by the film 102 in the direction of the width of the film in the vicinity of the film inlet/outlet port 104 of the cartridge. The film 102 has, on one side portion, perforations 102a spaced with predetermined equal intervals.

FIGS. 23A and 23B are cross-sectional views showing the width of the film 102. FIG. 23A shows the curling of the film 102 in its normal condition. FIG. 23B shows the curling of the film 102 after it has been under pressure F·F' for a long time. In FIG. 23A, the photographic film generally tends to curl with its emulsion face 102b concave, and in normal conditions, the curling depth C1 remains within a predetermined range.

FIGS. 24A and 24B show cross sections 24A, 24B of FIG. 22. FIG. 24A is the cross-sectional view of the film in its normal condition. FIG. 24B is the cross-sectional view of the film 102, wherein the film is wound by one-frame stroke after the camera has been left unused for a long time so that the subsequent frame 102c under a pressure F·F' comes to face the exposure opening 108. The cross sections 24A, 24B are those of the film 102 when, after a long period of unused time, a film winding operation advances the film 102, which has been under pressure F·F', to the exposure opening 108.

In FIG. 24A, the exposure opening 108 of a camera body 109 has, on its top and bottom sides, a pair of film rail surfaces 109a and a pair of pressure plate rail surfaces 109b, and a pressure plate 110 is pressed against the pressure plate rail surfaces 109b. In normal conditions, the film 102 is in contact with the pressure plate 110 substantially entirely within the exposure opening and thus keeps its flatness. Even when the film 102 is floated from the pressure plate 110 due to the film's variations or changes in its operating environment, the floating distance Z1 is kept to within a range of 0 to 0.02 mm.

When the cartridge is used on the camera, however, the film 102 is subject to the pressure F·F' arising from elastic deformation of the flanges 105b, 106b, in the vicinity of the film inlet/outlet port 104 of the cartridge as shown in FIG. 22. If the camera is left unused for a long time in the condition shown in FIG. 22, the film 102 suffers a curling under the pressure F·F', which cannot be corrected in a short time.

As shown in FIG. 23B, the film 102 that has been under the pressure F·F' for a long period of time suffers a deformation of curling depth of C2 (>C1) which is in excess of the predetermined value. Furthermore, as shown in FIG. 24B, in the portion of the film 102 that has been under the pressure F·F' for a long period of time, the pressure plate 110 presses a large curling, and reverses the curling on its center portion, and thus the film 102 is forwardly deformed in a convex direction by a large projection (Z2).

For example, if the film is wound by one-frame stroke after the camera is left under a pressure F·F' of 30 g for 24 hours, the floating distance Z2 in the center of the curling is 0.03 to 0.1 mm. When a picture is taken in this condition, the camera definitely causes an out-of-focus picture because a lens imaging plane and the film's sensitive surface disagree greatly on the optical axis in the center of the frame of the imaging place.

OBJECTS AND SUMMARY OF THE INVENTION

It is a first object of the present invention to provide a camera which results in well-focused pictures.

It is a second object of the present invention to provide a camera that prevents pictures from being out of focus regardless of the curling of a film.

It is a third object of the present invention to provide a camera that results in well-focused pictures even when the film is deformed after the camera is left unused for a long period of time.

It is a fourth object of the present invention to provide a camera which prevents pictures from being out of focus even when a curled film is used, wherein the film has been left, for a long period of time, under a pressure in the direction of the width of the film, due to elastic deformation of flanges attached inside a film cartridge.

According to the present invention, the camera using a film cartridge that pays out the film with a load exerted partly on the film in the direction of the width of the film, comprises measuring means for counting a time during which the film is left in a halt state with the film cartridge loaded in the camera body before a predetermined action is taken, and camera setting update means for updating camera setting during photographing based on the output from the measuring means.

These objects and advantages of the present invention will become apparent from the following detailed explanation and drawings.

BRIEF DESCRIPTION OF THE DRAWINGS

FIGS. 24A and 24B show the cross sections 24A, 24B of FIG. 22.

DETAILED DESCRIPTION OF THE PREFERRED EMBODIMENTS

Figure 1:
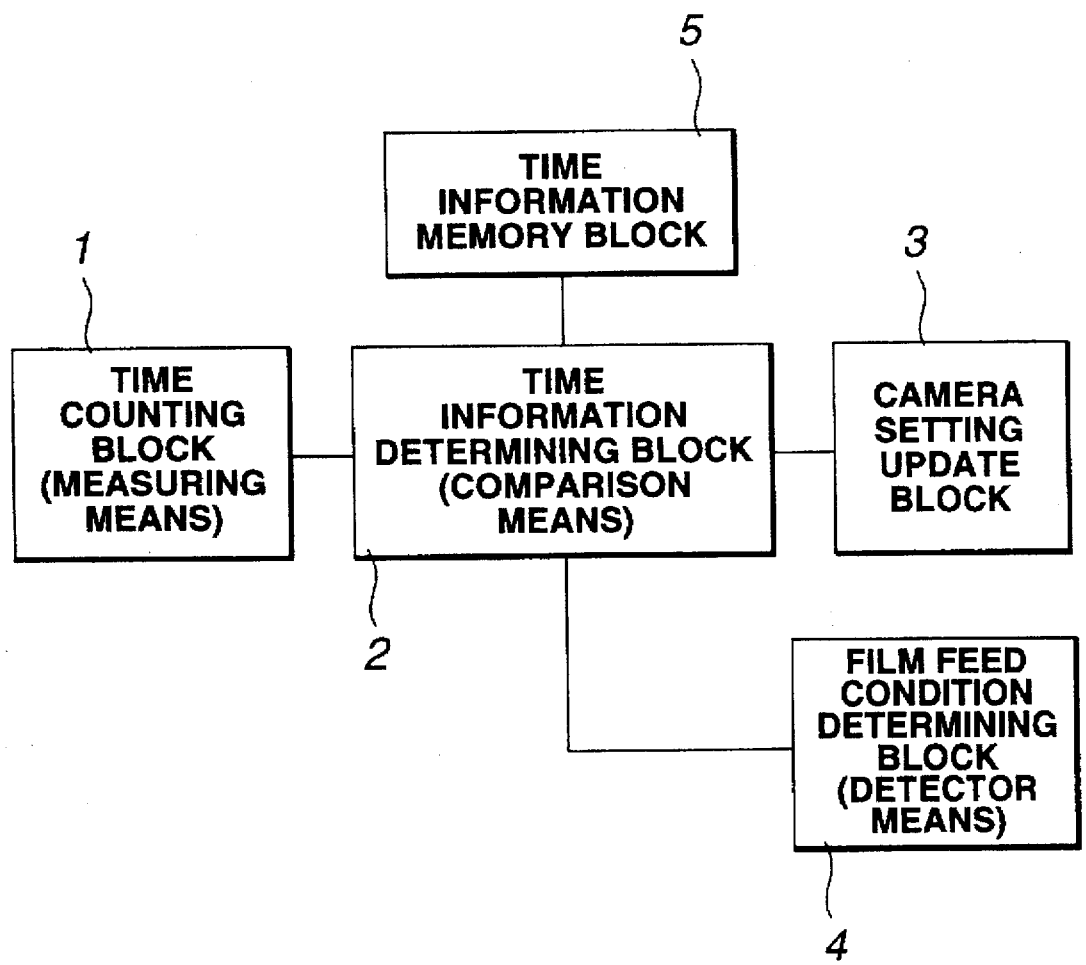
FIG. 1 is a block diagram showing a configuration of the camera of the present invention.

Referring now to the drawings, the embodiments of the present invention are discussed.

FIG. 1 is a block diagram showing the configuration of the camera according to the present invention. As shown, the block designated 1 is a time counting block as measuring means for counting time and date for the camera. Designated 4 is a film feed condition determining block as detection means for determining whether a predetermined feed of film is performed in the course of film winding or rewinding operation. A time information memory block 5, serving as time information memory means stores the time count given by the time counting block 1 when the film feed condition determining block 4 determines that the predetermined film feed has been performed. A time information determining block 2, serving as comparison means, causes the time information memory block 5 to store the time count of the time counting block 1 in response to the determination of the film feed condition determining block 4, and compares the time information stored in the time information memory block 5 with the time count given by the time counting block 1 in response to the determination of the film feed condition determining block, serving 4. Designated 3 is a camera setting update block as camera setting update means for updating a camera setting during photographing in response to the determination result of the time information determining block 2. The outputs of the time counting block 1, time information memory block 5, and film feed condition determining block 4 are inputted to the time information determining block 2, and the output of the time information determining block 2 is input to the camera setting update block 3.

Figure 2:
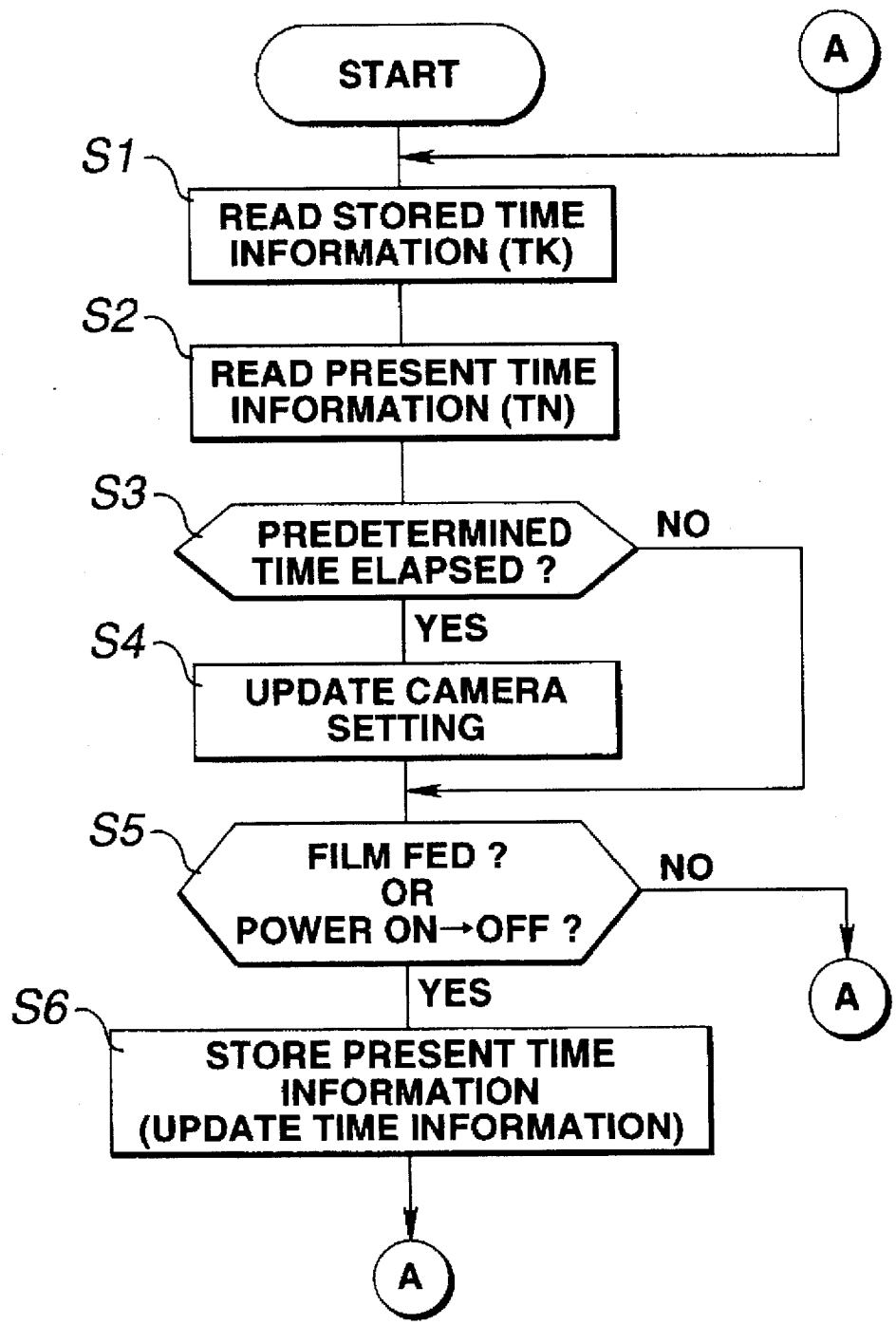
FIG. 2 is a flow diagram showing the operation of the camera of FIG. 1.

Referring to the flow diagram in FIG. 2, the camera thus configured is discussed. When the operation of the camera starts, the time information determining block 2 reads the time information (TK) stored in the time information memory block 5 (step S1), and then reads the present time information (TN) in the time counting block 1 (step S2). The time information determining block 2 then compares the stored time information (TK) with the present time information (TN) to determine whether both meet a predetermined relationship, for example, whether the difference between both is greater than a predetermined time (step S3). When the predetermined relationship is met, the sequence goes to step S4, where the time information determining block 2 instructs the camera setting update block 3 to update the camera setting (step S4).

When the determination at step S3 reveals that the predetermined relationship is not met, the sequence goes to step S5. The film feed condition determining block 4 determines whether the film is advanced by a predetermined feed (step S5). When step S5 reveals that the predetermined film feed is not yet performed, the sequence returns to step S1. When S5 reveals that the predetermined film feed is advanced, the sequence goes to step S6, where the present time information by the time counting block 1 is stored in the time information memory block 5 for updating. The sequence then returns to step S1 to start over there.

In the operation in FIG. 2, when the portion of the film that was kept pressed between the flanges in the film cartridge for a predetermined time or longer is advanced to the exposure opening (aperture), an influence on imaging performance caused by the curling of the film due to the pressure is corrected by updating the camera setting. The determination of whether it is "the predetermined time or longer" is herein performed based on the interval between the film feed actions.

Figure 3:
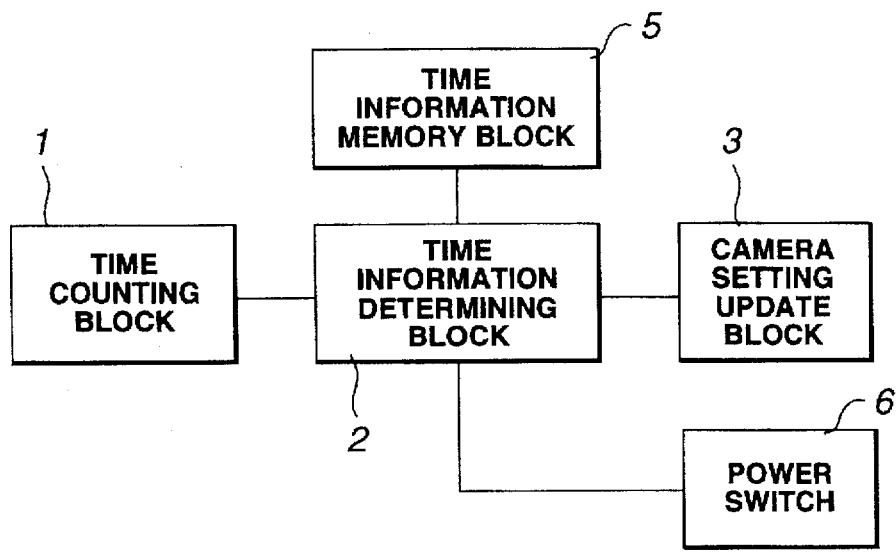
FIG. 3 is a block diagram showing another configuration of the camera of the present invention.

FIG. 3 shows another configuration of the camera of the present invention.

The difference from the configuration in FIG. 1 is that the present time information is stored in the time information memory block 5 and the stored time information in the time information memory block 5 is compared with the present time information in the time counting block 1 in response to the operation of a power switch 6 rather than the film feed condition determining block 4. The rest of the configuration and the object remain identical to those of the configuration in FIG. 1. The difference in operation with reference to the flow diagram in FIG. 2 lies in that the determination at step S5 is based on the off-to-on transition operation of the power switch 6 rather than the film feed action interval.

In the operation of the configuration in FIG. 3, when the portion of the film that was kept pressed between the flanges in the film cartridge for a predetermined time or longer is advanced to the exposure opening (aperture), an influence on imaging performance caused by the curling of the film due to the pressure is corrected by updating the camera setting. The determination of whether it is "the predetermined time or longer" is herein performed based on the interval between the operations of the power switch of the camera.

Figure 4:
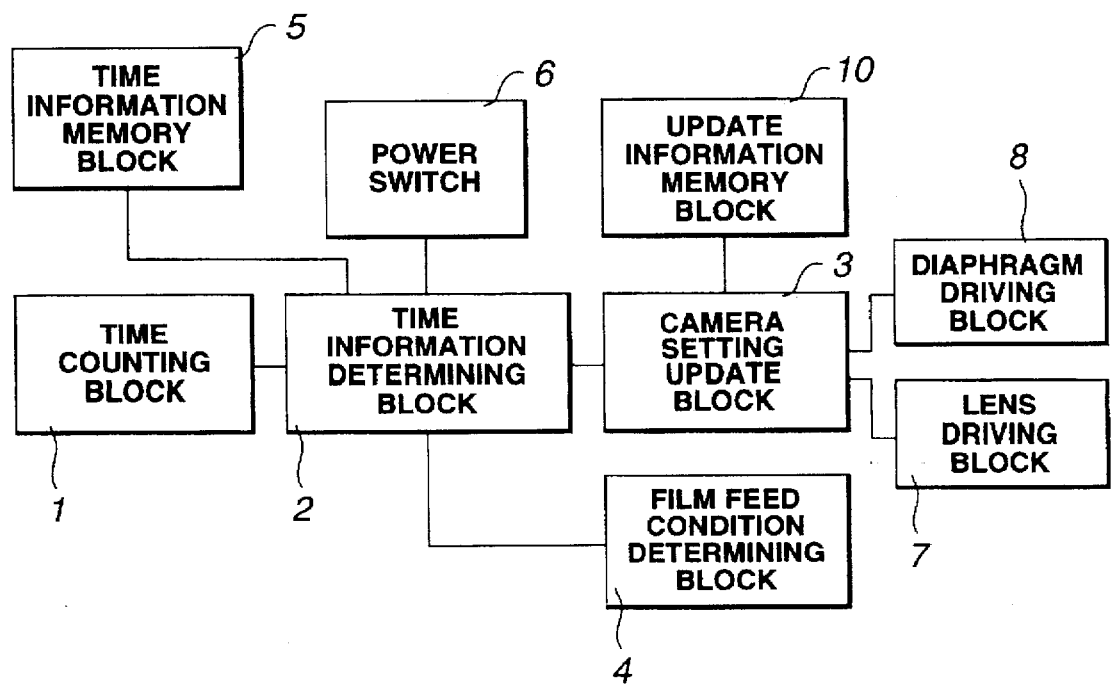
FIG. 4 is a block diagram showing the configuration of a camera that is a more specific version of the cameras of FIGS. 1 and 3.

FIG. 4 shows a configuration which is more specific than the configurations in FIGS. 1 and 3. The explanation about the components equivalent to those with reference to FIGS. 1 and 2 is not repeated herein.

FIG. 4 shows a lens driving block 7 and a diaphragm driving block 8, and both are controlled by the camera setting update block 3. The above problem associated with the related art is resolved by allowing the lens driving block 7 to drive the focusing lens further into the front mis-focus side than normal, and by allowing the diaphragm driving block 8 to drive the diaphragm into a smaller opening than normal. Designated 10 is an update information memory block which stores information on how much the lens driving block 7 should drive the focusing lens and how much the diaphragm driving block 8 should drive the diaphragm. The stored value the information bears is determined in consideration of an influence on imaging performance caused by the curling of the film due to the pressure applied thereto, wherein the curling or deformation appears when the portion of the film that was kept pressed between the flanges in the film cartridge for a predetermined time or longer is advanced to the exposure opening (aperture).

Figure 5:
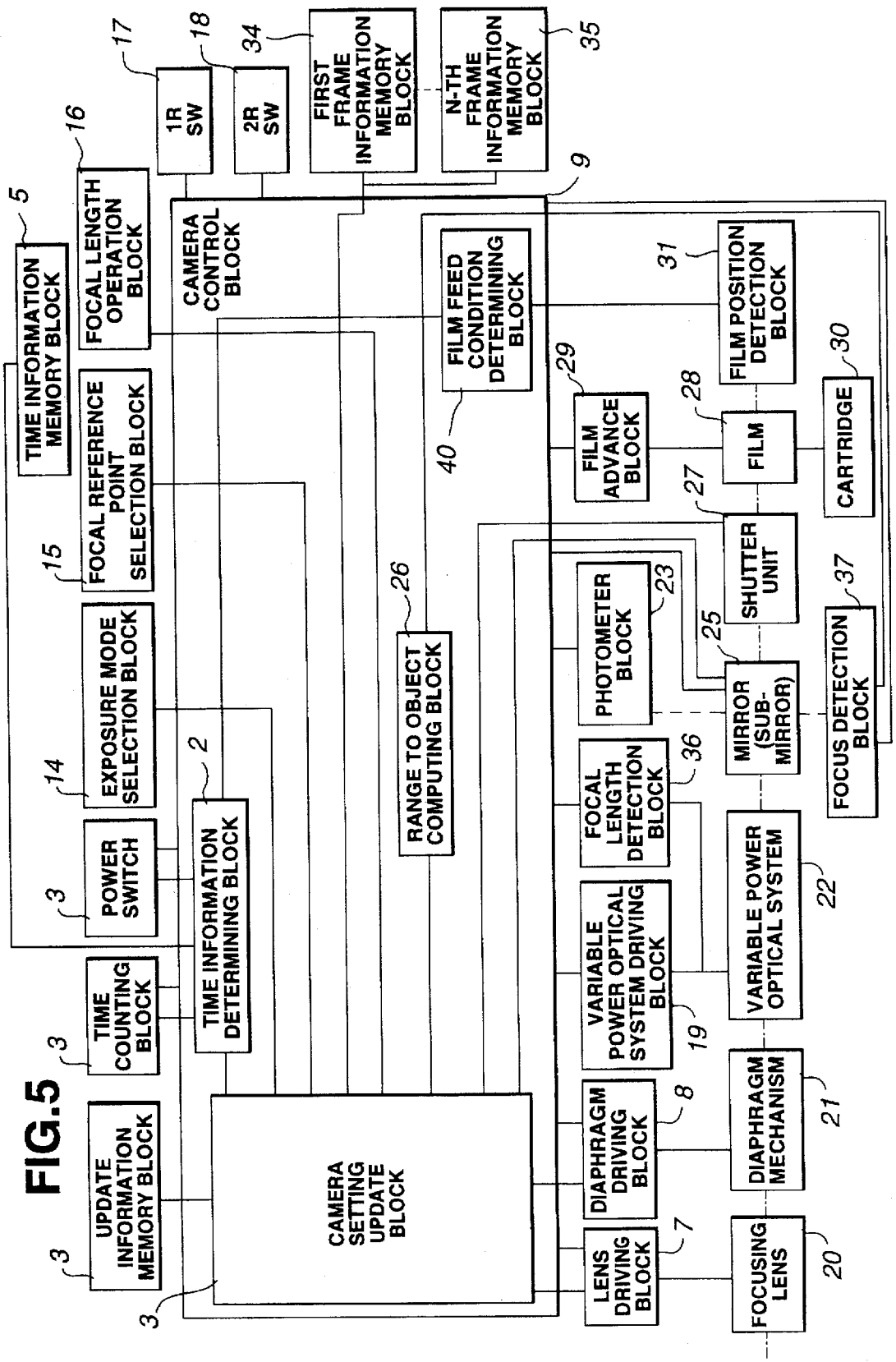
FIG. 5 is a block diagram showing a detailed configuration of the camera of the present invention.

FIG. 5 shows a detailed configuration of the camera of the present invention. The explanation of the components equivalent to those with reference to FIGS. 1 through 3 is not repeated herein. The components are configured as described below.

In FIG. 5, a camera control block 9 (hereinafter referred to as CPU 9) controls generally the camera. Designated 14 is an exposure mode selection block for selecting an exposure mode from P (program), M (manual), S (priority on shutter speed), and A (priority on diaphragm), and designated 15 is a focal reference point selection block for selecting a focal reference point. Also shown are a focal length operation block 16 for determining a focal length during photographing, a first release switch 17 (hereinafter referred to as 1R switch) of the camera and a second release switch 18 (hereinafter referred to as 2R switch) of the camera. Shown further are a variable power optical system driving block 19 that drives a variable power optical system for changing the focal length during photographing and a focusing lens 20 that is driven by the lens driving block 7. Designated 21 is a diaphragm mechanism that is driven by the diaphragm driving block 8 and designated 22 is the variable power optical system that is driven by the variable power optical system driving block 19. FIG. 5 further shows a photometer block 23 for measuring the luminance of the image of an object, a quick-return mirror 25 for guiding the light flux, which has passed through the imaging lens of the camera, to the viewfinder of the camera, and a range to object computing block 26 for computing the range to the object in response to the focal length detection result from a focus detection block. Also shown are a shutter unit 27 that is used during exposure, a film 28 for recording the image of the object, a film advance block 29 for driving the film in winding or rewinding the film identified as film block 28, and a (film) cartridge 30 in which the film 28 is housed. Designated 31 is a film position detection block constructed of a photo-reflector and the like for detecting the feed of the film 28. Also shown are a present frame information memory block 34 for storing the present frame information for the present frame, an N-th frame information memory block 35 for storing the camera frame information for the N-th frame, and the focus detection block 37 for detecting the focus condition of the image of the object.

Figure 6:
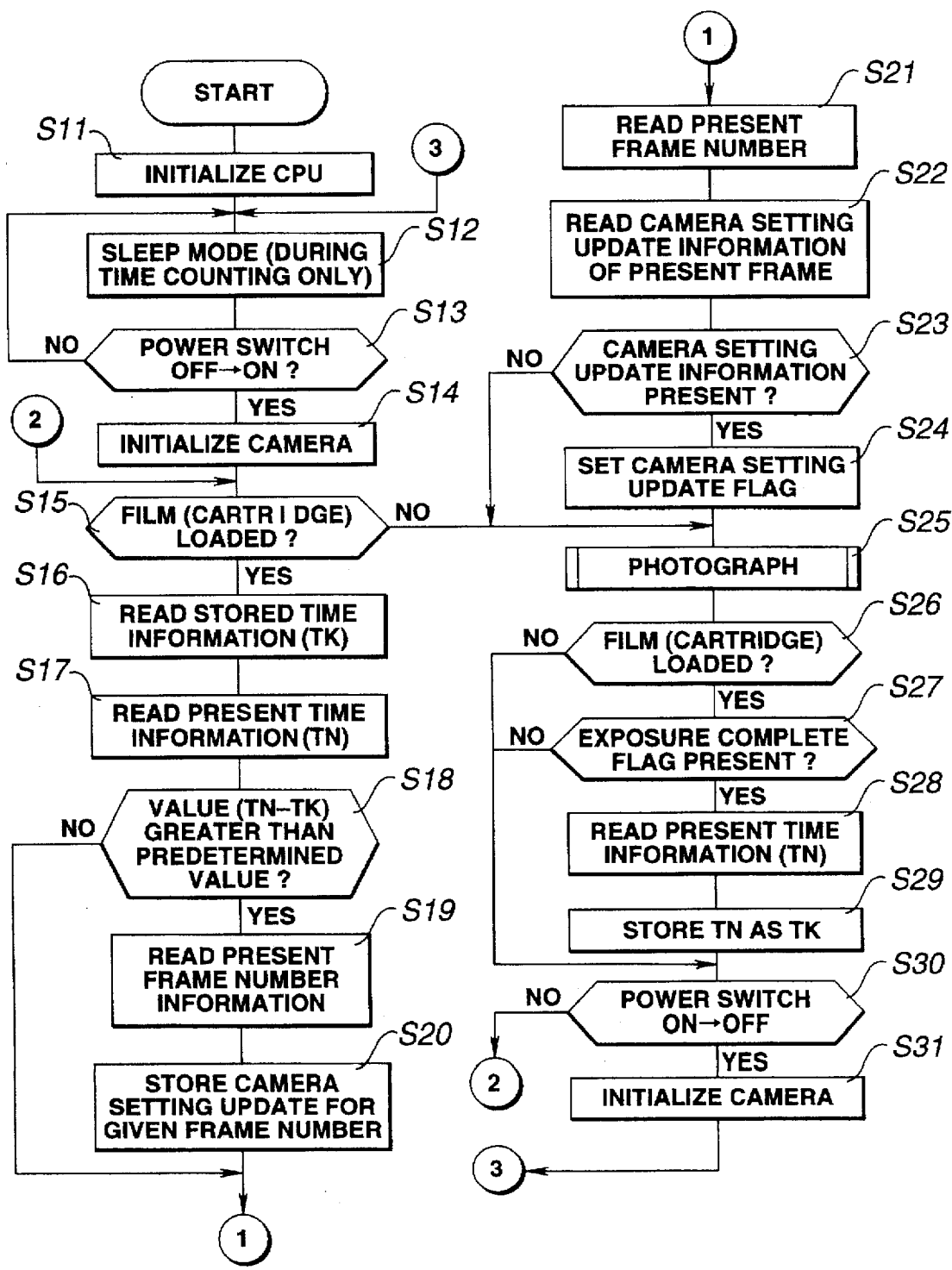
FIG. 6 is a flow diagram showing the operation of the camera of FIG. 5.

Referring now to the flow diagram in FIG. 6, the operation of the camera thus constructed is discussed. When the camera starts operating, CPU 9 performs initialization (step S11). In succession, CPU 9 goes to a sleep mode. In this mode, the camera remains inactive, except that a small current (tens of micro amperes) is allowed to flow to keep the time counting block 1 alive for continuous time counting (step S12). The time counting block 1 may be optionally contained in CPU 9.

CPU 9 determines whether the power switch 6 is on or off. When the power switch 6 is not on, the sequence returns to step S12 (step S13). When step S13 reveals that the power switch 6 is on, the camera is initialized (for initial setup) (step S14). Referring to prior art switches or the like, CPU 9 determines whether the film cartridge 30 is loaded in the camera (step S15). When the cartridge 30 is found to be not loaded at step S15, the sequence goes to step S25, because steps S16 through S24 to be described later are unnecessary.

When step S15 reveals that the cartridge 30 is loaded in the camera, the sequence goes to step S16. CPU 9 reads the time information (TK) stored in the time information memory block 5 (step S16), reads the present time information (TN) of the time counting block 1 (step S17), compares TN with TK, and determines whether the (time) difference between both is greater than a predetermined value, namely, whether the film was pressed between the flanges in the cartridge 30 more than the predetermined time (step S18). When it is not greater than the predetermined time, the sequence goes to step S21.

Figure 7:
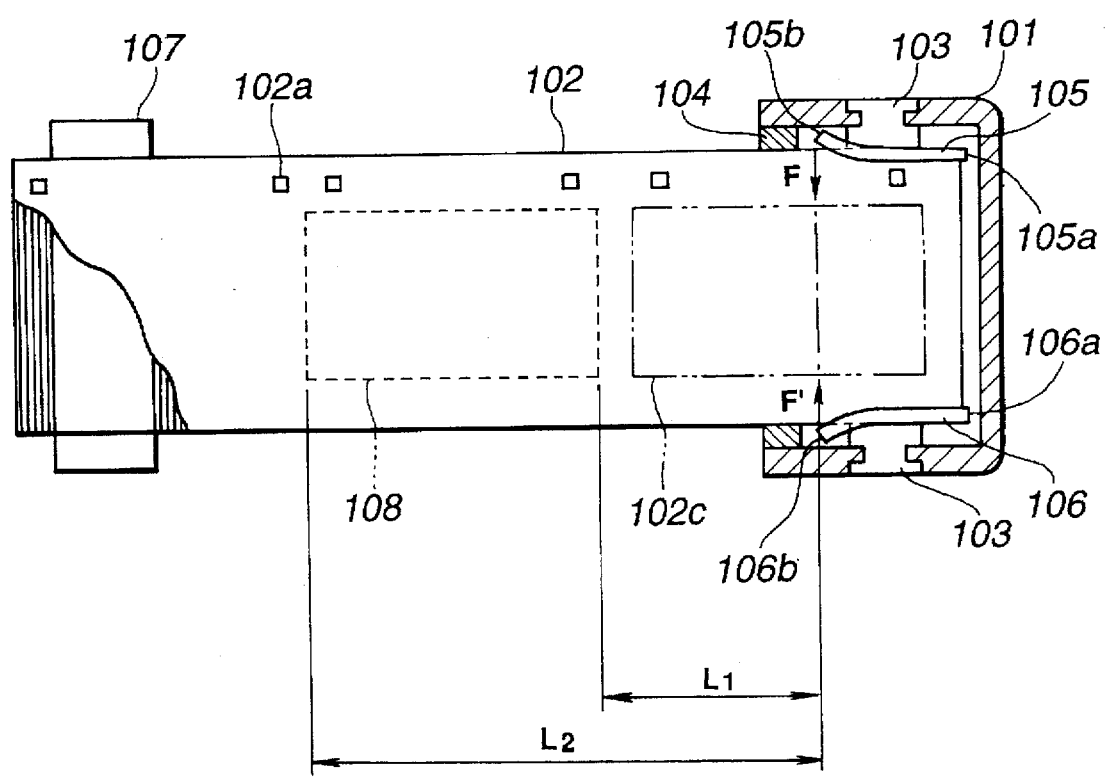
FIG. 7 is a cross-sectional view showing lengths L1 and L2 between flanges 105b, 106b for determining whether a frame of the film needs updating in camera setting and the sides of the exposure opening 108.

When the predetermined time has elapsed, the sequence goes to step S19, where CPU 9 reads the present frame number information corresponding to the exposure opening (aperture) from a frame number information memory block not shown in FIG. 5. Based on the present frame number information read at step S19, CPU 9 calculates what frame of the film is now pressed between the flanges in the cartridge 30, and causes the N-th frame information memory block 35 to store camera setting update command information to be used for camera setting update in this frame (step S20). The frame of the film (N-th frame) which is in need of camera setting update with respect to the present frame is determined referring to lengths L1, L2 between the flanges 105b, 106b and the exposure opening 108 (see FIG. 7).

CPU 9 reads the present frame number information in the same way as at step S19 (step S21), and based on the reading of the present frame number information, reads the information from the present frame information memory block 34 that stores the information of presence or absence of the camera setting update command information (S22). CPU 9 determines whether the information read at step S22 indicates the updating of the camera setting or not (step S23).

When the information for camera setting update command is present, the sequence goes to step S24, where a camera setting update enable flag is set. When the information for camera setting update command is absent, the sequence goes to step S25. Then, the subroutine "photograph" is performed. Thus, an actual photographing is performed (step S25). The subroutine "photograph" will be described later with reference to FIG. 9.

When the subroutine "photograph" is complete, the sequence goes to step S26. CPU 9 determines whether the film cartridge 30 is loaded in the camera in the same way as at step S15 (step S26). When the cartridge 30 is not loaded, the sequence goes to step S30, because steps S27 through S29 to be described later are unnecessary.

When CPU 9 at step S26 determines that the cartridge 30 is loaded in the camera, the sequence goes to step S27. A determination is made of whether an "exposure complete flag" is present (step S27). The "exposure complete flag" is set if one or more frames are photographed during the subroutine "photograph" at step S25. The present invention is not limited to the exposure complete flag. Another flag equally works if it is set in synchronism with any slight feeding motion of the film.

If there is no "exposure complete flag" at step S27, the time information update to be described later is not performed, because the film pressed between the flanges in the cartridge 30 continues to be pressed without any movement from there. Therefore, the sequence goes to step S30. If there is an "exposure complete flag" at step S27, the sequence goes to step S28, because CPU 9 determines that the position of the film pressed between the flanges in the cartridge 30 is changed by the film feeding (winding) motion in succession to the exposure. CPU 9 reads the present time information (TN) of the time counting block 1 in the same way as at step S17 (step S28).

CPU 9 stores in the time information memory block 5 the present time information (TN) read at step S28 as a start of the hold time at which the film starts being pressed between the flanges in the cartridge 30 (step S29). CPU 9 determines whether the power switch 6 is transitioned from on to off (step S30). When the power switch 6 is not off, the sequence returns to step S15 to start over thereafter.

When the power switch 6 is off, the sequence goes to step S31, where the camera is initialized (for initial setup, retraction and other operations). The sequence then goes to step S12 for the sleep mode (power-saving mode). As already described, the camera remains inactive, except that the time counting block 1 performs time counting operation.

Through a series of steps in FIG. 6, the time counting for the portion of the film pressed between the flanges in the cartridge 30 is performed, and based on the time counting result, camera setting update is performed as discussed next.

Figure 8:
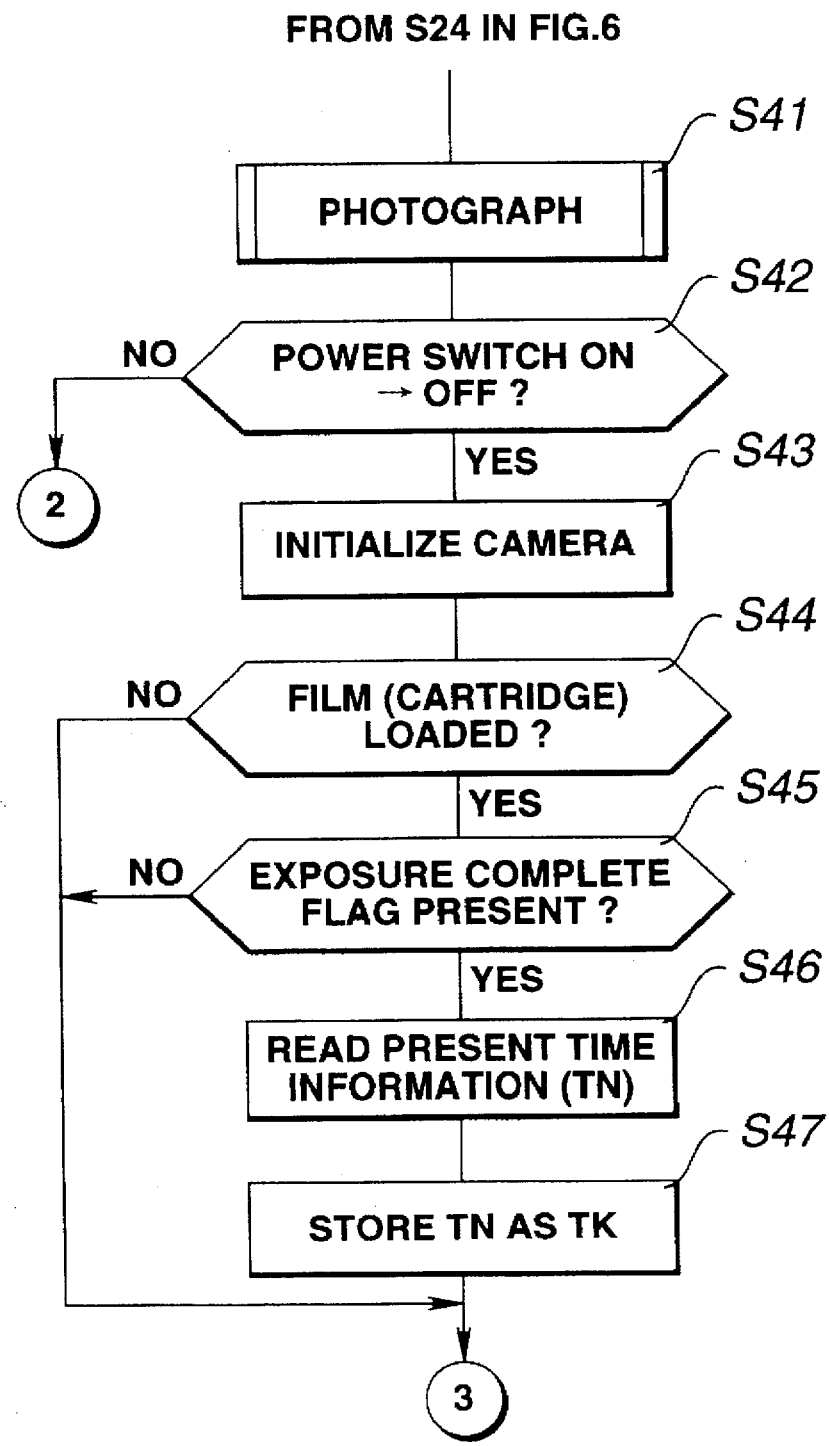
FIG. 8 is a flow diagram showing the operation of the camera of FIG. 6 with improvements incorporated in its operational sequence of steps S25 thereafter.

The sequence of step S25 thereafter in FIG. 6 may be replaced with the sequence of step S41 thereafter in FIG. 8. Namely, step S41 in FIG. 8 is identical to step 25 in FIG. 6, step S42 in FIG. 8 to step S30 in FIG. 6, and steps S42 through S47 respectively to steps S26 through S29 in FIG. 6. In this case, the stored time information (TK) is updated only when there is an exposure complete flag after the power switch 6 is transitioned from off to on.

Figure 9:
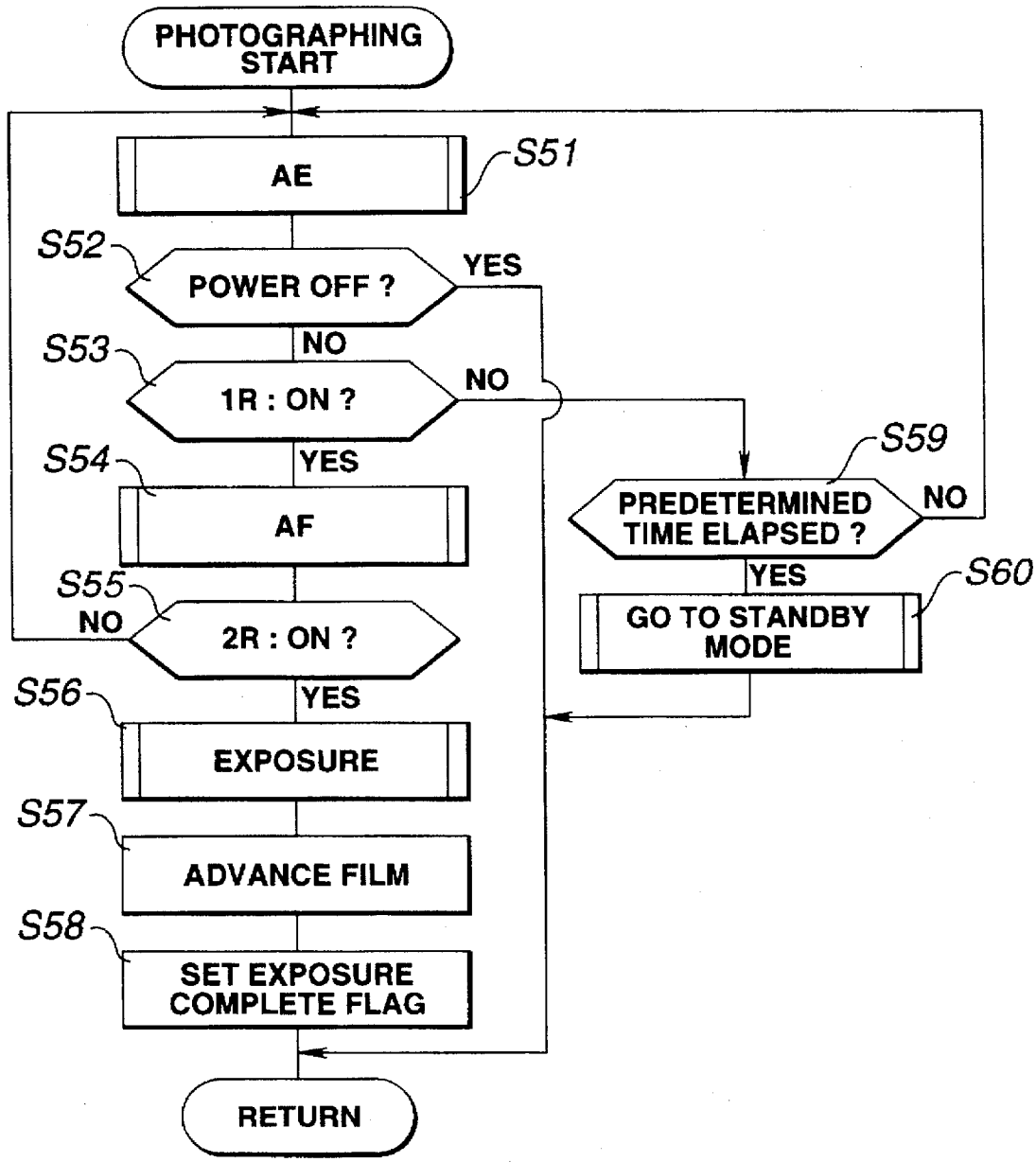
FIG. 9 is a flow diagram showing the operation of the subroutine "Photograph" performed at step S25 in FIG. 6.

Referring to the flow diagram in FIG. 9, the operation of the subroutine "photograph" performed at step S25 in FIG. 6 is now discussed. When the subroutine is called, CPU 9 performs the subroutine "AE" to compute photometer and exposure settings (step S51). The subroutine "AE" will be detailed later with reference to FIG. 10. When the subroutine "AE" is complete, the sequence goes to step S52. CPU 9 determines whether the power switch 6 is off or not (step S52). If the power switch 6 is off, the sequence returns to the main routine. If the power switch 6 is on, the sequence goes to step S53. A determination is made of whether 1R switch 17 of the camera is on or not (step S53). If the 1R switch 17 is on, the sequence goes to step S54, and if it is off, the sequence goes to step S59.

Next, CPU 9 performs the subroutine "AF" for focus detection, range to object computation and lens projection (step S54). The subroutine "AF" will be detailed later with reference to FIG. 12. When the subroutine "AF" is complete, the sequence goes to step S55.

A determination is made of whether 2R switch 18 of the camera is on (exposure start command action) (step S55). If 2R switch 18 is on, the sequence goes to step S56, and if it is off, the sequence returns to step S51. At step S56, CPU 9 performs the subroutine "exposure" to carry out an actual exposure. The subroutine "exposure" will be detailed later with reference to FIG. 13.

When the subroutine "exposure" is complete, the sequence goes to step S57. Since one frame finishes its exposure, the film 28 is advanced by a predetermined feed (in winding operation) by the film advance block 29 (step S57). Further, the finish of one exposure sets the already-described "exposure complete flag" (step S58). The sequence returns to exit the subroutine.

When 1R switch 17 of the camera is off at step S53, the sequence goes to step S59, where an unshown timer or the like determines whether a predetermined time has elapsed since 1R switch 17 was turned off. When the predetermined time has not elapsed, the sequence returns to step S51. When the predetermined time has elapsed, the sequence goes to step S60, where the camera is shifted to a standby mode, and then the sequence returns to the main routine.

Figure 10:
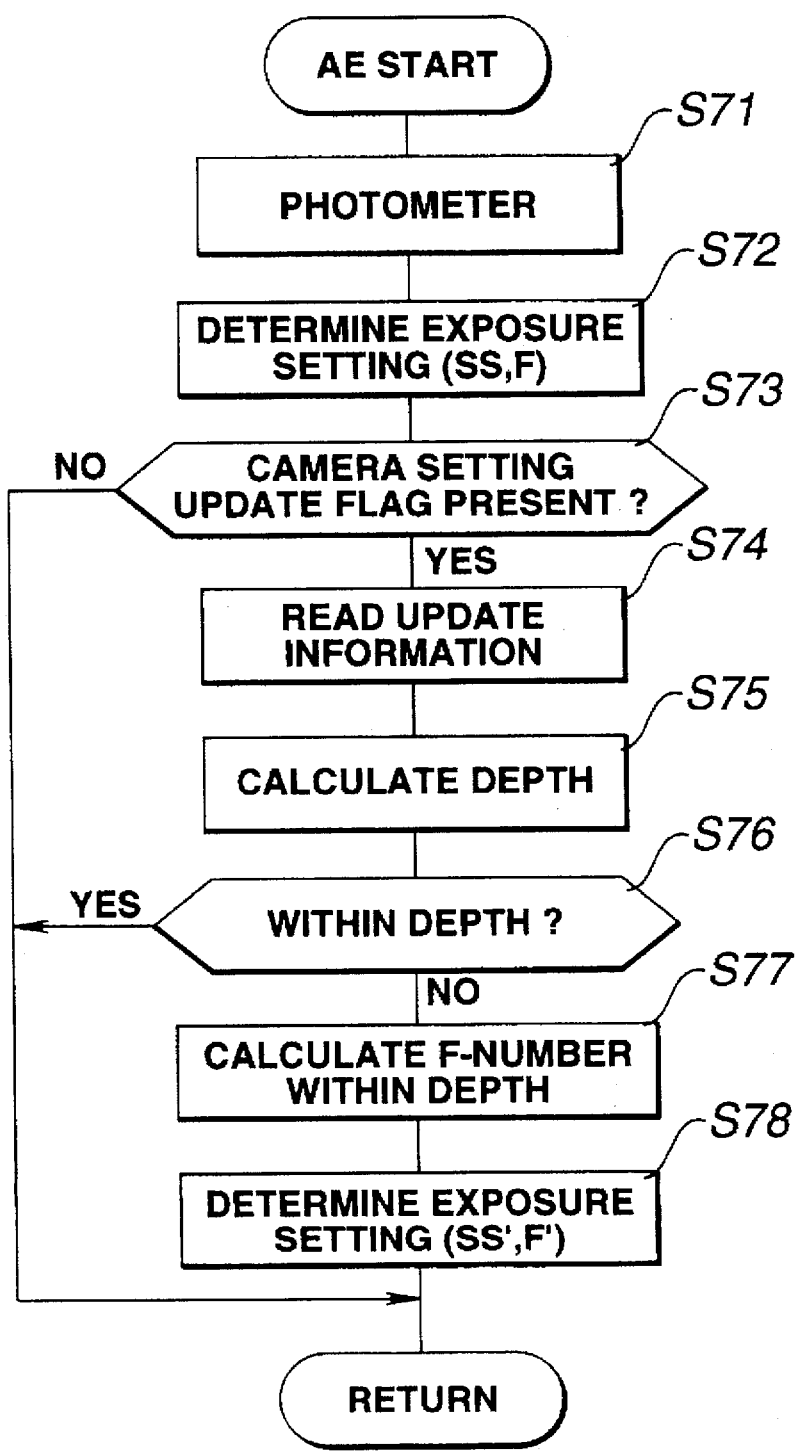
FIG. 10 is a flow diagram showing the operation of the subroutine "AE" performed at step S51 in FIG. 9.

Referring to the flow diagram in FIG. 10, the operation of the subroutine "AE" performed at step S51 in FIG. 9 is discussed.

When the subroutine is called, CPU 9 photometrically measures the image of the object with the photometer block 23 (step S71). In response to the photometric result at step S71, exposure settings (shutter speed SS, aperture value F) are determined. CPU 9 determines whether there is a camera setting update enable flag or not (step S73). The camera setting update enable flag is set as required at step S24 in FIG. 6. If the camera setting update enable flag is not set, the sequence returns to the main routine, because the photographing is performed in principle according to the exposure settings (SS, F) determined at step S72.

When the camera setting update enable flag is set at step S73, the sequence goes to step S74. CPU 9 reads the camera setting update information stored in the update information memory block 10 in FIG. 5 (step S74) and, based on the read information, computes if the object is within the depth of field of the present exposure settings (SS, F).

The following equations are now considered.

$$K(A) = f \times f / L \tag{1}$$

$$K(A)' = f \times f / L + LP \tag{2}$$

$$FD = FNO \times DH \tag{3}$$

where

K(A): Lens projection referenced to infinity [m]

f: Focal length [m]

L: Range to an object [m]

K(A)': Lens projection referenced to infinity when the film suffers curling [m]

FD: Depth of focus

FNO: Aperture value

DH: Permissible circle of confusion (30 microns)

LP: Curling of the film stored in the update information memory block 10 [m], and corresponding to Z2 in FIG. 24B If the relationship K(A)+FD>K(A)' is herein true, namely, if FNO×DH>LP is true, the object falls within the depth of field even with the film having a curling (LP). If the above relationship does not hold true, the effect of the curling of the film on the image plane may be disregarded by updating the aperture value so that it satisfies the relationship of FNO>LP/DH.

For example, with EV (exposure value)=12, TV (time value)=6 (1/60 [sec]), AV (aperture value)=6 (FNO=8), and LP=0.1 [mm], FNO>LP/DH=3.33. No problem will arise even if the aperture value is unmodified. With EV=9, TV=5 (1/30 [sec]), AV=4 (FNO=4), and LP=0.2 [mm], FNO>LP/DH=6.67. By updating the aperture value (FNO=6.67 or greater), the effect of the curled film on the image plane is disregarded. In this case, the exposure settings may be updated as follows: TV=3 (SS'=1/15 [sec], AV=6 (FNO=8) and EV=9.

Returning to the subroutine, a determination is made of whether the above described relationship of K(A)+FD>K(A)', or FNO×DH>LP, holds true, namely, whether the object falls within the depth of field (step S76). If step S76 reveals that the object is within the depth of field, no update is required and the sequence returns. If step S76 reveals that the object fails to be within the depth of field, the sequence goes to step S77. As described above, the calculation of an FNO that satisfies FNO>LP/DH is performed (step S77). In response to the result of the calculation, CPU 9 sets an aperture value that offsets the effect of the film curling, and a shutter speed that reflects the update of the aperture value (step S78), and the sequence returns to step S52 in FIG. 9.

Figure 11:
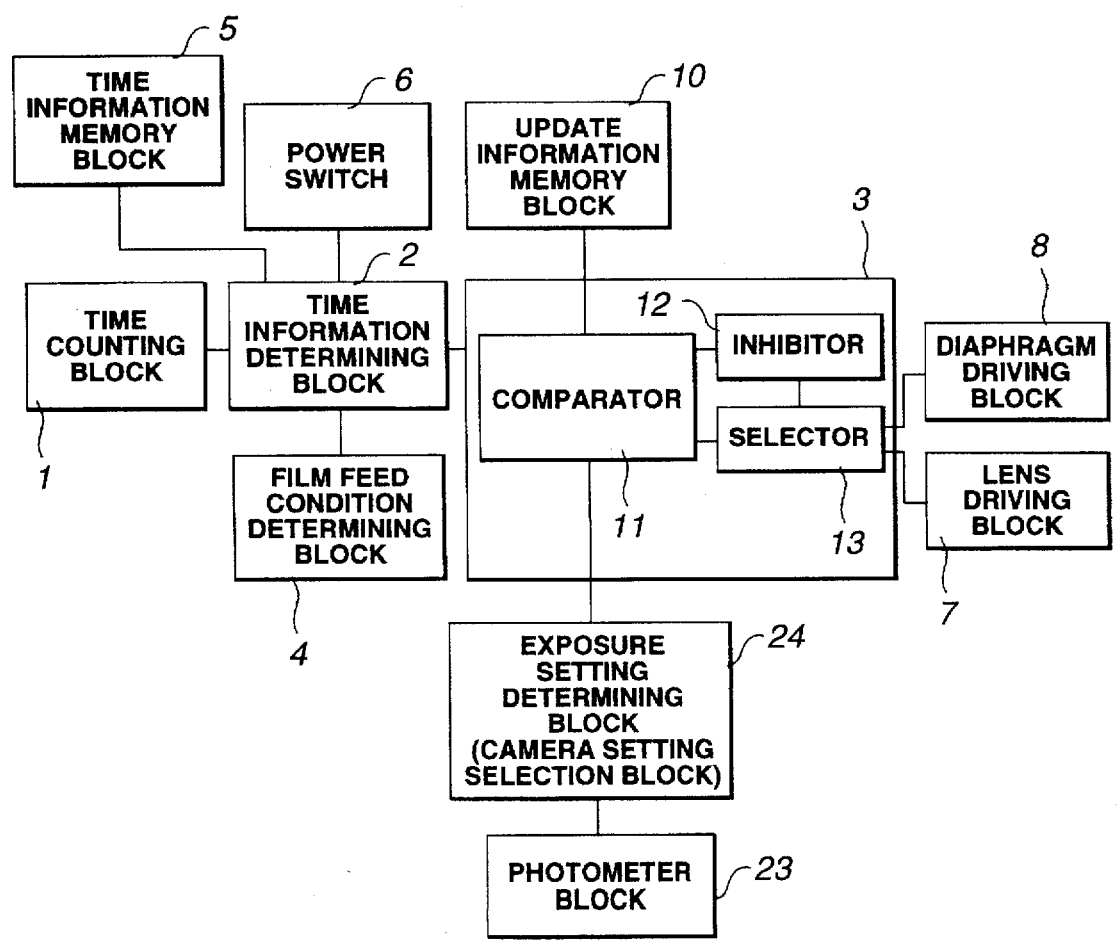
FIG. 11 is a block diagram showing a simplified version of the configuration of FIG. 5.

FIG. 11 is a simplified version of the configuration of FIG. 5.

In FIG. 11, the camera setting update block 3 comprises a comparator 11, an inhibitor 12, and a selector 12. The comparator 11 compares the information from the update information memory block 10 with the determined exposure settings from the exposure setting determining block 24, and determines whether the present camera setting needs updating in the aperture value and lens movement setting. If the comparator 11 determines that no update is required, it instructs the selector 13 to cause the inhibitor 12 to inhibit the lens driving block 7 and diaphragm driving block 8 from modifying their control values according to the curling of the film. If the comparator 11 determines that the aperture value or lens movement setting needs updating, it instructs the selector 13 to modify control values of the lens driving block 7 and diaphragm driving block 8 in accordance with the curling of the film.

Figure 12:
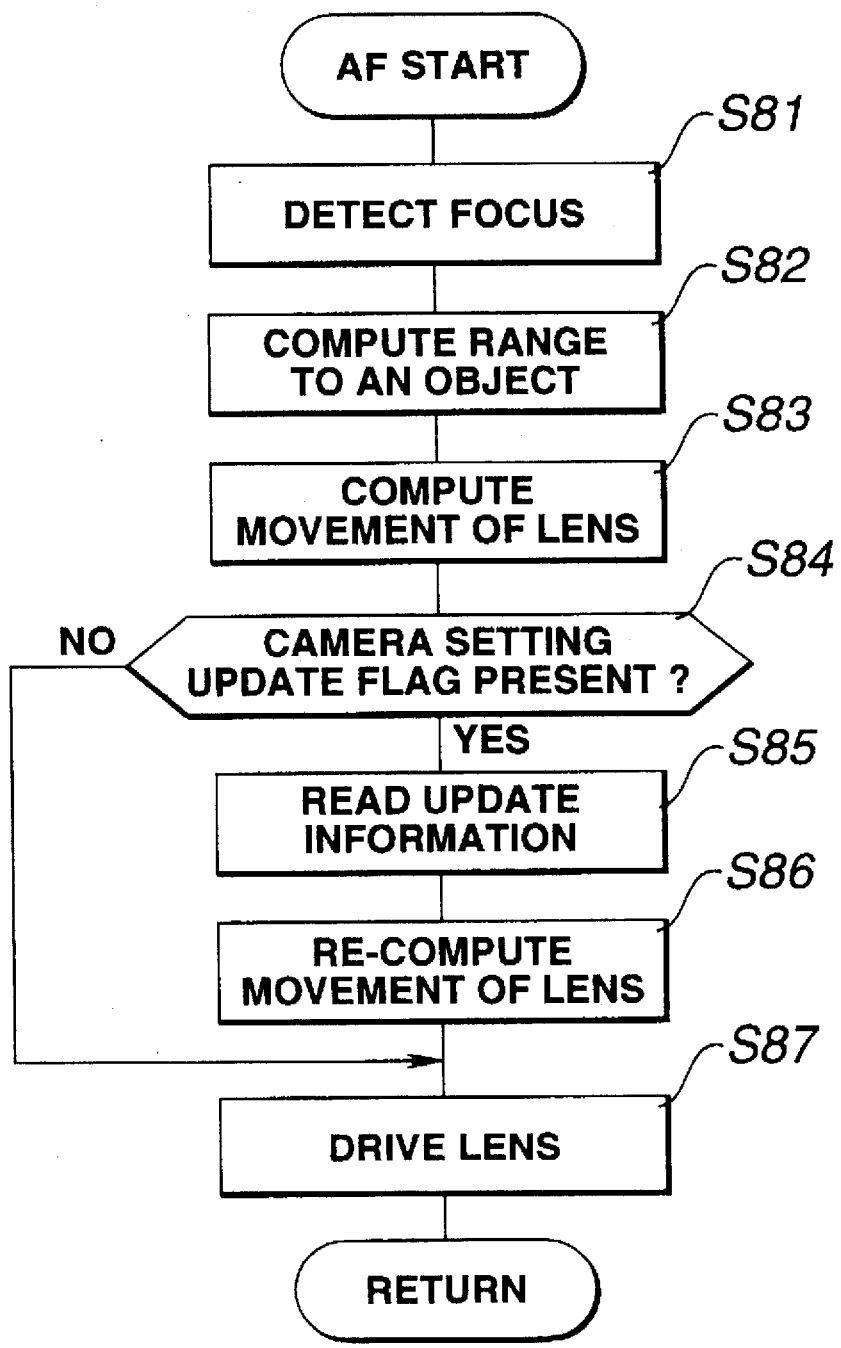
FIG. 12 is a flow diagram showing the subroutine "AF" performed at step S54 in FIG. 9.

Referring to the flow diagram in FIG. 12, the operation of the subroutine "AF" performed at step S54 in FIG. 9 is now discussed. In this subroutine, CPU 9 performs focus detection of the object in the focus detection block 37 (step S81).

In response to the focus detection result at step S81, CPU 9 computes the range to the object at the range to object computing block 26 (step S82), and then computes lens movement setting in response to the range to the object obtained at step S82 (step S83). The lens movement setting K(A) in normal conditions is based on the above described equation (1).

A determination is made of whether there is a camera setting update enable flag (step S84). The camera setting update enable flag is set as required at step S24 in FIG. 6. If there is no camera setting update enable flag, the sequence goes to step S87, because lens driving is performed in principle according to the lens movement setting K(A) determined at step S83.

If there is a camera setting update enable flag at step S84, the sequence goes to step S85. The camera setting update information stored in the update information memory block 10 in FIG. 5 is read, and based on the read information, the lens movement setting K(A)' that reflects the curling of the film is recomputed (step S86). K(A)' is based on the above described equation (2). According to lens movement settings K(A), K(A)' determined at steps S83 or S86, the lens driving block 7 drives the focusing lens 20 (step S87).

The above description covers the updating of the aperture value in the direction of closing the opening and additional driving of the focusing lens in the direction of projection to reflect the curling of the film in camera setting. Whether either one of the aperture value and the lens movement setting or both the aperture value and the lens movement setting are updated may be decided depending on the exposure settings, photographing focal length, and the like. In this case, the update of the exposure settings (aperture value, lens movement setting) depends on the above described equations (1) through (3), in principle.

Figure 13:
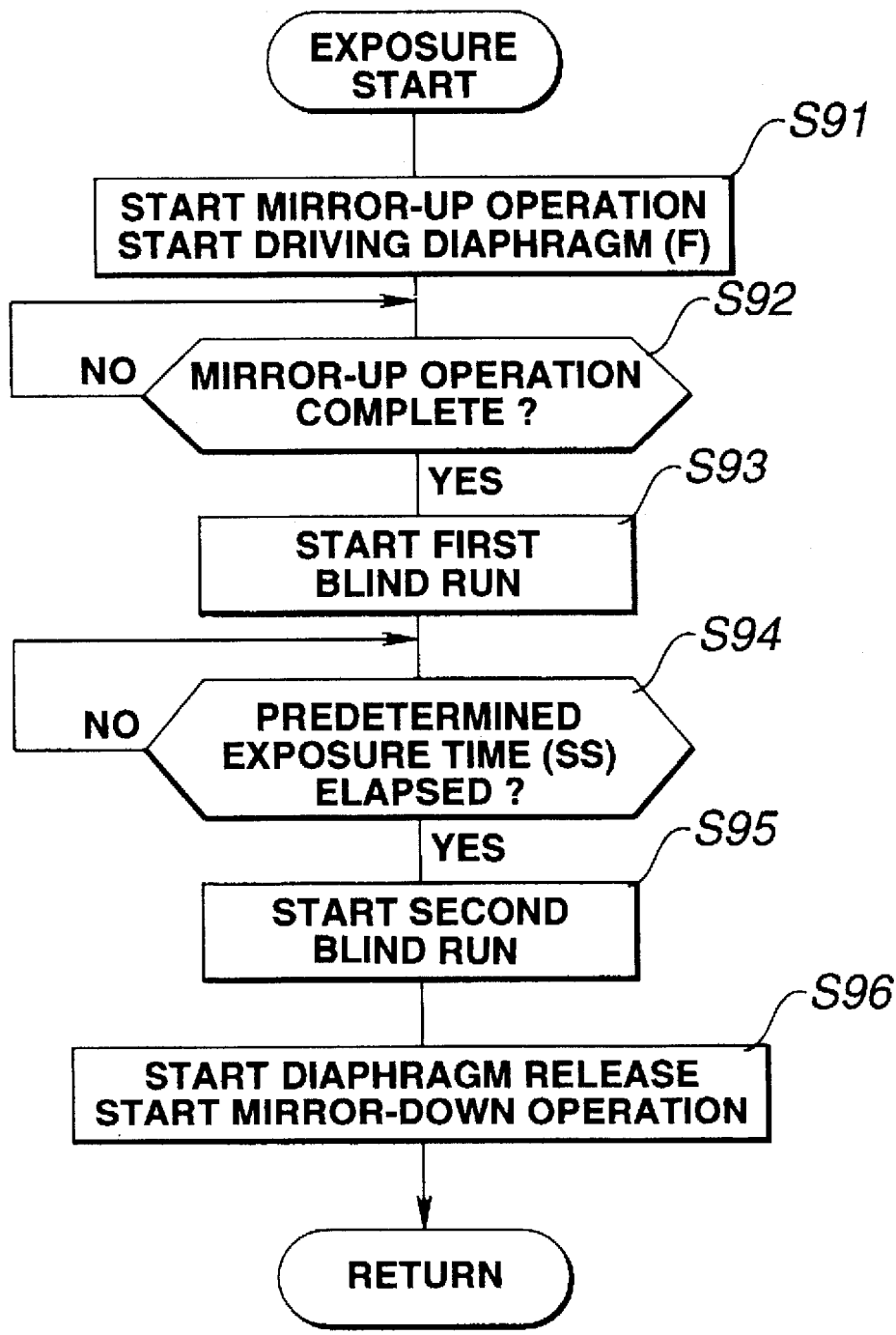
FIG. 13 is a flow diagram showing the subroutine "Exposure" performed at step S56 in FIG. 9.

Referring to the flow diagram in FIG. 13, the operation of the subroutine "exposure" performed at step S56 is discussed.

When the subroutine is called, CPU 9 starts driving the mirror 25 and allows the diaphragm driving block 8 to drive the diaphragm mechanism 21 for its closing operation. If there is a camera setting update enable flag and if the aperture value needs updating in its closing direction, the diaphragm is driven according to the value of the information stored in the update information memory block 10 (step S91). Next, a determination is made of whether the mirror-up operation of the mirror 25 is complete or not (step S92), and this step is repeated until the mirror-up operation is complete.

The first blind run of the shutter unit 27 is started (step S93), and a determination is made of whether a predetermined exposure time has elapsed (step S94). This step is repeated until the predetermined exposure time has elapsed. The second blind run of the shutter unit 27 is started (step S95). The diaphragm driving block 8 starts driving the diaphragm mechanism 21 for opening operation and the mirror-down operation of the shutter unit 27 is started (step S96). The sequence returns, and CPU 9 causes the film advance block 29 to advance the film (in the winding operation).

Through the above series of steps in the camera sequence, the hold time during which one frame of the film remains pressed between the flanges in the cartridge 30 is counted, the aperture value is updated in the direction of closing the opening and the focusing lens is additionally driven in the direction of projection, thereby reflecting the curling of the film in camera setting.

Figure 14:
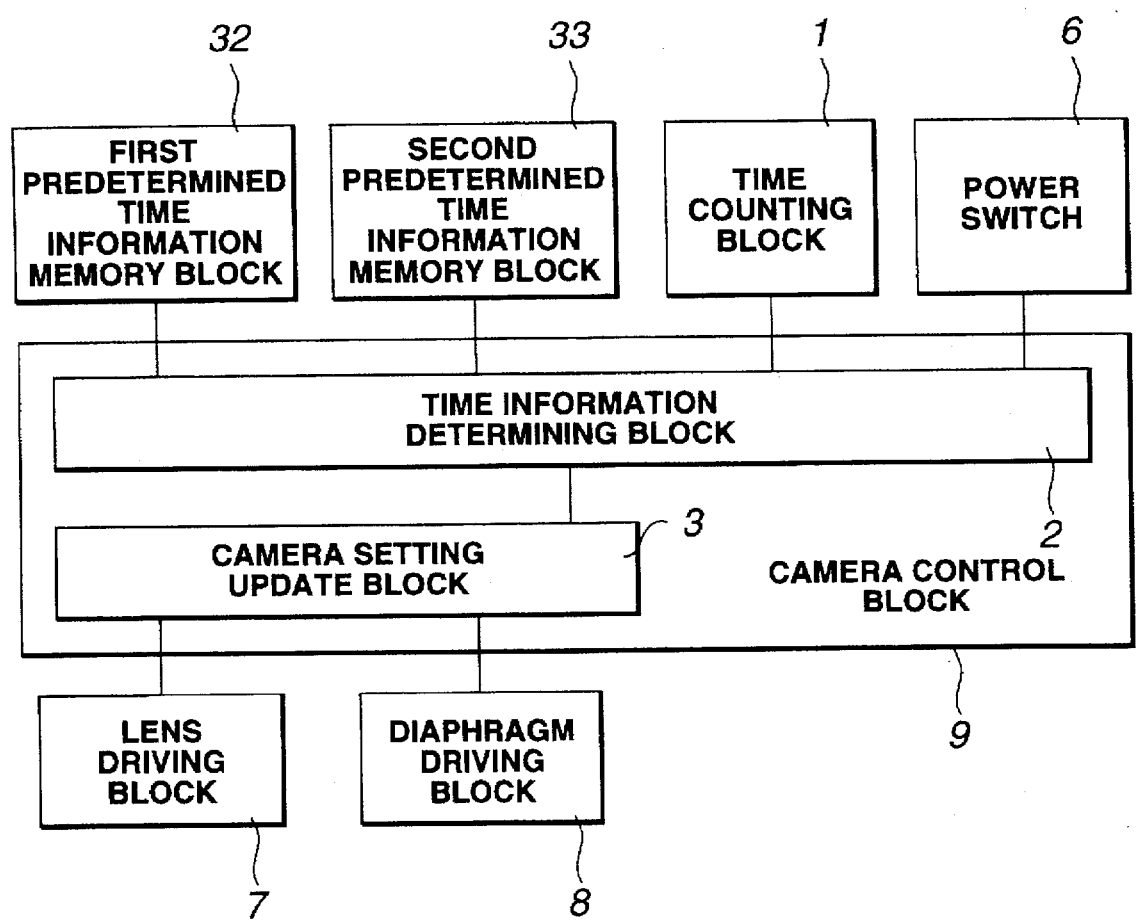
FIG. 14 is a block diagram showing an embodiment of the present invention, wherein a camera setting is updated based on the hold time during which the film has been held pressed between the flanges in the cartridge 30.
Figure 15:
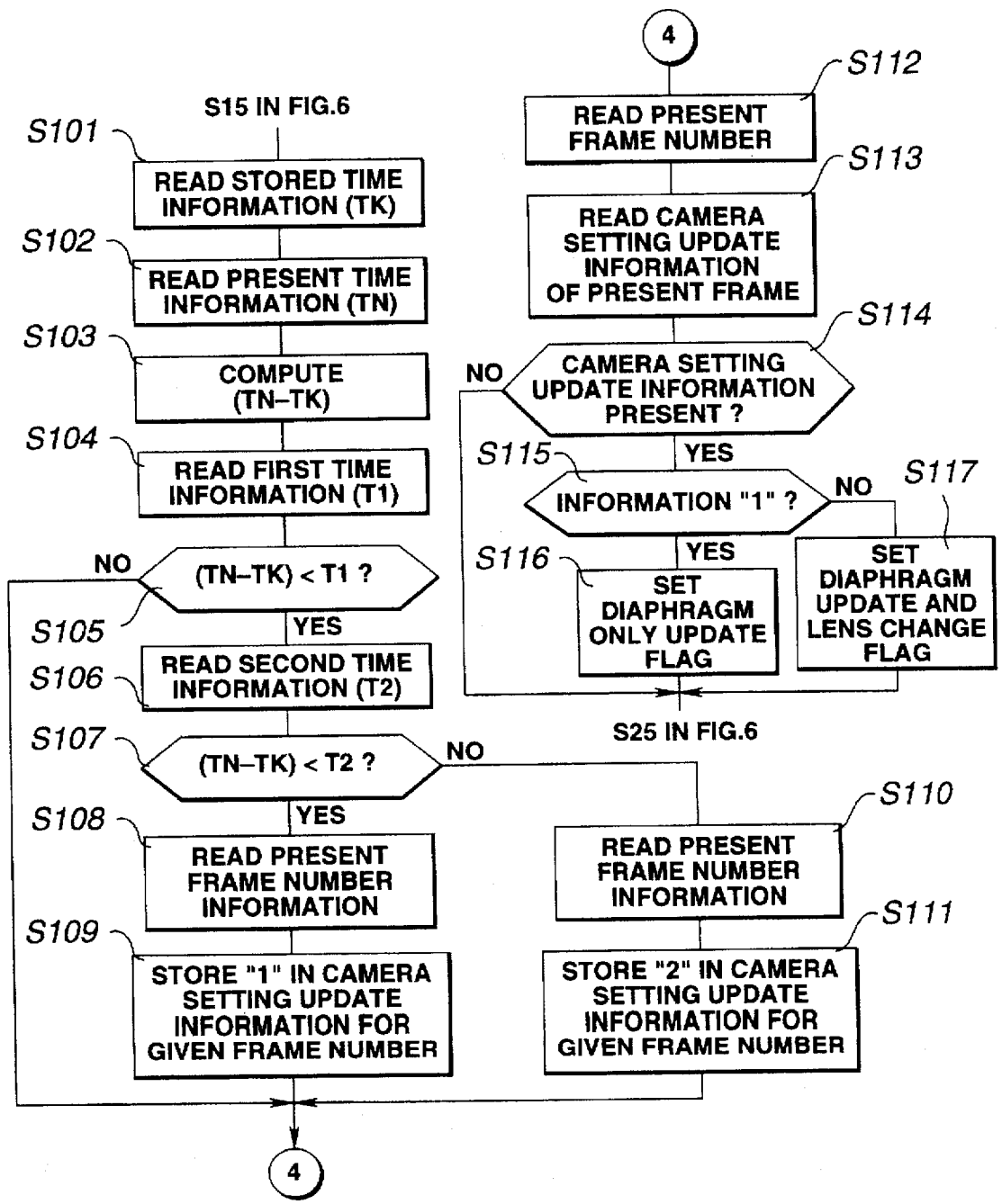
FIG. 15 is a flow diagram showing the operation of the configuration of FIG. 14.

Referring to the block diagram in FIG. 14 and the flow diagram in FIG. 15, discussed is the embodiment in which the camera setting is updated based on the hold time of the film that is continuously pressed between the flanges in the cartridge 30 in the present invention. FIG. 14 is a block diagram of the configuration of the embodiment, and shows the major components in comparison with FIG. 5. The difference from the embodiment in FIG. 5 is that the time information memory block 5 is replaced with a first predetermined time information memory block 32 and a second predetermined time information memory block 33.

Referring to the flow diagram in FIG. 15, the operation is now discussed. Most of the operation agrees with that in the flow diagram in FIG. 6, and the discussion focuses on the difference from FIG. 6. In succession to step S15 in FIG. 6, at step S101 in FIG. 15, the stored time information (TK) stored in the time information memory block 5 is read (corresponding to step S16 in FIG. 6). CPU 9 reads the present time information (TN) from the time counting block 1 at step S102 (corresponding to step S17).

CPU 9 compares TN with TK to compute the (time) difference (step S103), and reads the first predetermined time information T1 stored in the first predetermined time information memory block 32 (step S104). CPU 9 determines whether the (time) difference information (TN−TK) computed at step S103 is smaller (shorter) than the first predetermined time information T1 read at step S104, namely, whether the film currently being pressed between the flanges in the cartridge 30 has continuously been pressed longer than the first predetermined time T1 (step S105). If the film has not been pressed longer than the first predetermined time T1, the sequence goes to step S112.

If the computation reveals that the film has been pressed longer than the first predetermined time T1, the sequence goes to step S106. CPU 9 reads the second predetermined time information T2 stored in the second predetermined time information memory block 33. The times T1 and T2 are related as T1<T2.

CPU 9 determines whether the (time) difference information (TN−TK) computed at step S103 is smaller (shorter) than the second predetermined time information T2 read at step S106, namely, whether the film currently being pressed between the flanges in the cartridge 30 has continuously been pressed longer than the second predetermined time T2 (step S107). If the film has been pressed longer than the second predetermined time T2, the sequence goes to step 110 ((TN−TK)>T2).

If the film has not been pressed longer than the second predetermined time T2, the sequence goes to step S108 (T1<(TN−TK)<T2). CPU 9 reads the present frame number information corresponding to the exposure opening (aperture) from the frame number information memory block not shown in FIGS. 5 and 14 (step S108). Based on the present frame number information read at step S108, CPU 9 calculates the frame number of the film that is currently pressed between the flanges in the cartridge 30, and then stores, in the N-th frame information memory block 35, "1" as camera setting update command information for updating the camera setting in that frame (step S109).

The reason the information "1" is stored is as follows.

Steps S105 and S107 reveal that the relationship of T1<(TN−TK)<T2 is now true. The hold time during which the film is pressed between the flanges in the cartridge 30 determines, although roughly, the curling of the film portion that is advanced to the exposure opening (aperture) 108. If the hold time is long enough, the film is expected to greatly curl at the exposure opening (aperture). If the hold time is of middle duration, the degree of curling of the film suffers variations depending on temperature, humidity and the like. If the lens movement setting in the camera setting is updated in such a middle hold time, there is a possibility that an out-of-focus photographing may result. Therefore, when the hold time (TN−TK) is of middle duration, falling within the range of T1<(TN−TK)<T2, it is preferred to update the aperture value only. To this end, when T1<(TN−TK)<T2 is verified, a piece of information conveying this should be stored in the N-th frame information memory block 35. That piece of information is herein "1." Relative to the present frame, the frame of the film which is in need of camera setting update is determined referring to lengths L1, L2 between the flanges 105b, 106b and the exposure opening 108 as already described with reference to FIG. 7. The sequence then goes to step S112.

At step S110, CPU 9 reads the present frame number information corresponding to the exposure opening (aperture) from the frame number information memory block not shown in FIGS. 5 and 14. At step S111, based on the present frame number information read at step S110, CPU 9 calculates the frame number of the film that is currently pressed between the flanges in the cartridge 30, and then stores, in the N-th frame information memory block 35, "2" as camera setting update command information for updating the camera setting in that frame.

The reason the information "2" is stored is as follows.

Steps S105 and S107 reveal that the relationship of (TN−TK)>T2 is now true. The hold time during which the film is pressed between the flanges in the cartridge 30 determines, although roughly, the curling of the film portion that is advanced to the exposure opening (aperture) 108. If the hold time is long enough, the film is expected to greatly curl at the exposure opening (aperture). As already described with reference to step S109, no problems will arise if the lens movement setting and further the aperture value as well in the camera setting are updated. When (TN−TK)>T2 is verified, a piece of information conveying this should be stored in the N-th frame information memory block 35. That piece of information is herein "2." The sequence then goes to step S112.

At step S112, CPU 9 reads the present frame number information in the same way as at step S21 in FIG. 6. Based on the present frame information read at step S112, CPU 9 reads the information stored in the present frame information memory block 34 including, in connection with the present frame, the presence or absence of the camera setting update command information of "1" or "2" telling which camera setting not to update (step S113).

A determination is made of whether the stored information read at step S113 contains the camera setting update command (step S114). When the camera setting update command information ("1" or "2") is contained, the sequence goes to step S115. If no camera setting update command information is contained, the sequence goes to step S25 in FIG. 6.

At step S115, CPU 9 reads the camera setting update command information stored in the N-th frame information memory block 35, and determines whether or not the information is "1" (for updating the aperture value only). If it is "1," the sequence goes to step S116. In response to the camera setting update command information of "1," CPU 9 sets an aperture value only update enable flag (step S116), and the sequence goes to step S25 in FIG. 6.

If step S115 reveals that the information is "2" (for updating the aperture value and the lens movement setting), the sequence goes to step S117. In response to the camera setting update command information of "2," CPU 9 sets a aperture value and lens movement update enable flag. The sequence goes to step S25 in FIG. 6 (step S117).

Since, in the above operation in FIG. 15, updates of the camera setting (aperture value and lens movement setting) are determined depending on the hold time during which the film is pressed between the flanges in the cartridge 30, the exposure operation is performed under the optimum camera setting in consideration of the curling of the film.

Discussed next is the update method of the camera setting according to the exposure modes of the camera (P, M, S, and A), referring to the flow diagram in FIG. 16.

Figure 16:
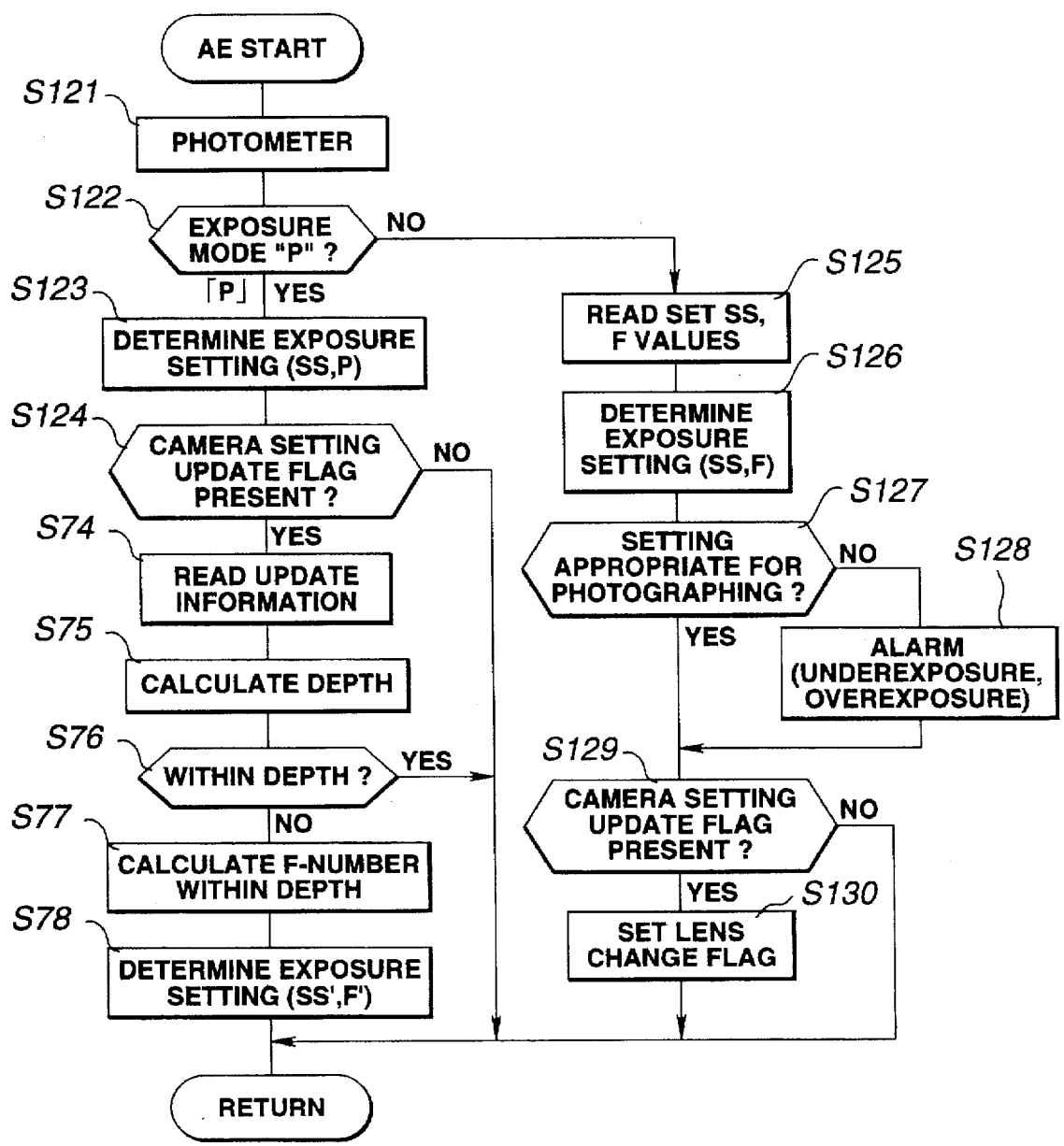
FIG. 16 is a flow diagram explaining the update method of camera setting in accordance with the exposure modes (P, M, S, A) of the camera.

In principle, the operation in FIG. 16 is substituted for the subroutine "AE" in FIG. 10 (and is used as step S51 in FIG. 9). When this subroutine is called, the photometer block 23 photometrically measures the object (step S121). CPU 9 determines whether the exposure mode of the camera is a program mode in which the camera automatically sets the shutter speed and aperture value. The exposure mode is selected and set by the exposure mode selection block 14. If the exposure mode is found to be the program mode, the sequence goes to step S123. If the exposure mode is found to be other than the program mode (namely, the manual mode (M), priority shutter speed mode (S), or priority diaphragm mode (A)), the sequence goes to step S125 (step S122).

In response to the photometric result at step S121, the exposure settings (shutter speed SS, aperture value F) are determined (step S123). A determination is made of whether there is a camera setting update enable flag (step S124). The camera setting update enable flag is set as required at step S24 in FIG. 6. If there is no camera setting update enable flag, the sequence returns, because photographing is performed in principle according to the exposure settings (SS, F) determined at step S123. If there is a camera setting update enable flag, the same operation specified at steps S74 through S78 in FIG. 10 is performed and then the sequence returns.

Discussed next is the operation of the modes (of M, S, and A) other than the program mode at step S122. At step S125, CPU 9 reads the shutter speed and aperture value a photographer sets in the M mode, S mode or A mode. CPU 9 determines the optimum exposure settings (shutter speed SS, aperture value F) based on the photographer-set shutter speed and aperture value read at step S125 (step S126). A determination is made of whether the exposure settings determined at step S126 are appropriate (namely, well within a range of working interlock) (step S127). If the exposure settings are found to be appropriate, the sequence goes to step S129. If they are found to be not appropriate (not within the range of working interlock), namely, they are underexposure or overexposure, CPU 9 gives a warning telling so at step S128.

At step S129, CPU 9 determines, in the same way as at step S124, whether there is a camera setting update enable flag. If there is no camera setting update enable flag, the sequence returns, because photographing is performed in principle according to the exposure settings (SS, F) determined at step S126.

If there is a camera setting update enable flag, the sequence goes to step S130. At step S130, CPU 9 set information "3," indicating that lens movement setting is to be updated, in the present frame information memory block 34 as a block for functioning to update the camera setting in consideration of the curling of the film. Although the camera setting update enable flag is set, the shutter speed and aperture value are unconditionally determined by the exposure mode set by the photographer, and an aperture value update (in the direction of closing) to compensate for the curling of the film fails to reflect the intention of the photographer in his setting, and is thus undesirable. In such a case, the curling of the film is compensated for by updating the lens movement setting rather than by updating the aperture value. By storing this information, the curling of the film is compensated for by updating the lens movement setting in the subroutine "AF" at step S54 in FIG. 9.

In the operation in FIG. 16, the curling of the film is compensated for in accordance with the exposure mode set by the photographer with the option allowed to select between updating the aperture value and updating the lens movement setting. The curling of the film is thus compensated for while keeping the camera setting that reflects the intention of the photographer. The exposure modes have been discussed in connection with the P mode, M mode, S mode and A mode. Alternatively or additionally, the above operation is applied to other exposure modes such as a portrait mode or night view mode where a more specific scene of photographic interest is aimed.

In the above discussion, after step S129, the information indicative of the update of the lens movement setting is stored at step S130. Alternatively, the sequence may return without going to step S130, if the object is found to be within the depth of field under the exposure settings determined at step S125 prior to step S130, as already described at steps S75, S76 with reference to FIG. 10.

Figure 17:
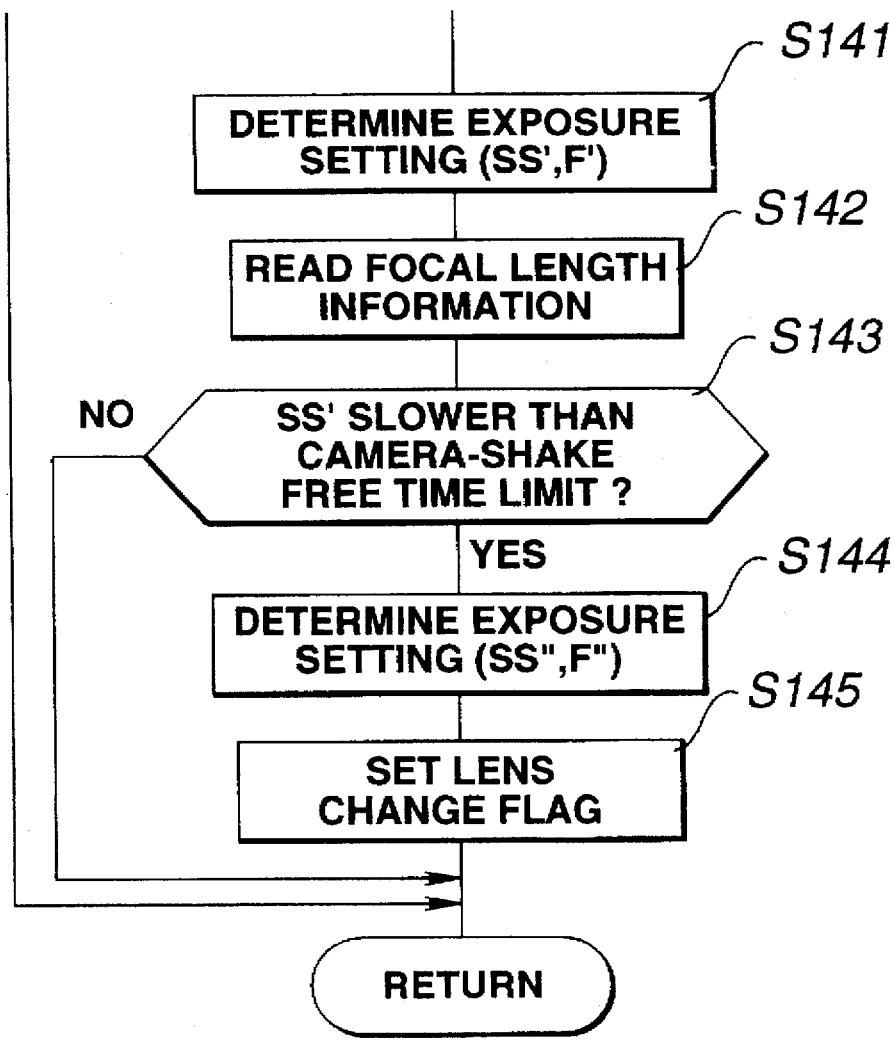
FIG. 17 is a flow diagram showing another embodiment of the subroutine "AE" described with reference to FIG. 10.

Referring to the flow diagram in FIG. 17, the operation of another embodiment of the subroutine "AE" described in FIG. 10. The operation in FIG. 17 is partly common to the operation in FIG. 10.

In succession to step S77 in FIG. 10, the aperture value F' that offsets the effect of the curling of the film and the shutter speed SS' that reflects the aperture value F' are set at step S141 in FIG. 17, in response to the computation result at step S78. A focal length detection block 36 in FIG. 5 then reads the present focal length information f (step S142).

Based on the focal length information f read at step S142, CPU 9 determines whether the shutter speed SS' determined at step S141 is slower (longer) than a camera-shake free time limit (step S143). For example, 1/f (the reciprocal of the focal length) [sec] may be used as the camera-shake free time limit.

If the shutter speed SS' [sec] is found to be slower (longer) than the camera-shake free time limit, the sequence goes to step S144 (step S143). If not, the sequence returns. When the shutter speed SS' [sec] is found to be slower than the camera-shake free time limit (1/f [sec]), the camera-shake free time limit (1/f [sec]) is set to be as the shutter speed SS' during exposure, and based on this, the aperture value F' is determined as the exposure settings (step S144).

CPU 9 sets the information "3," indicating that lens movement setting is to be updated, in the present frame information memory block 34 as a block for functioning to update the camera setting in consideration of the curling of the film (step S145). Although the shutter speed and aperture value are determined based on the information stored in the update information memory block 10 with the camera setting update enable flag set, an aperture value update (in the direction of closing) to compensate for the curling of the film fails prolongs the shutter speed. This is undesirable, because the camera is likely to suffer shake during exposure.

In such a case, the curling of the film is compensated for by updating the lens movement setting rather than by updating the aperture value. By storing this information, the curling of the film is compensated for by updating the lens movement setting in the subroutine "AF" at step S54 in FIG. 9.

In the operation in FIG. 17, the present focal length condition and the shutter speed during exposure determines whether the curling of the film is compensated by updating the aperture value or by updating the lens movement setting. If there is a possibility of camera shake, the curling of the film is compensated for by updating the lens movement setting. Thus, the curling of the film is compensated for without shortening the shutter speed while preventing camera shake during photographing.

In the above discussion, 1/f (the reciprocal of the focal length) [sec] is used as the camera-shake free time limit. Alternatively, a known gyro device is used to pick up mechanical vibrations (shake), the movement of image attributed to the camera shake is computed, and the shutter speed SS' may be set such that image movement is controlled to within a tolerable level (for example, within a permissible circle of confusion).

In the above discussion, after step S144, the information indicative of the update of the lens movement setting is stored at step S145. Alternatively, the sequence may return without going to step S145, if the object is found to be within the depth of field under the exposure settings determined at step S144 prior to step S145, as already described at steps S75, S76 with reference to FIG. 10.

Figure 18:
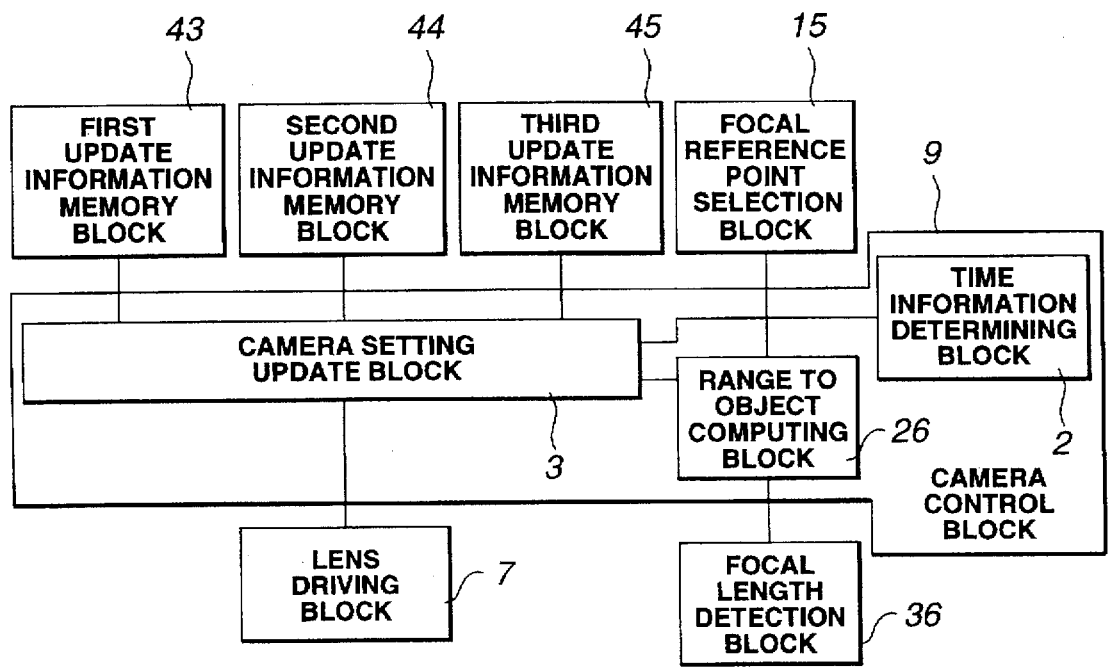
FIG. 18 is a block diagram showing another embodiment of the subroutine "AF" described with reference to FIG. 12.
Figure 19A:
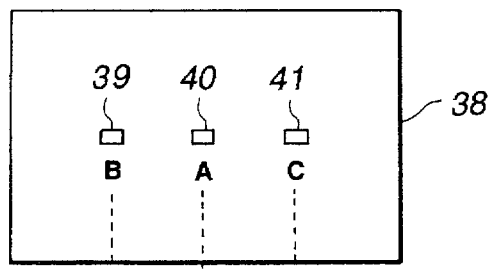
FIGS. 19A and 19B show a picture frame and focal reference points.
Figure 19B:
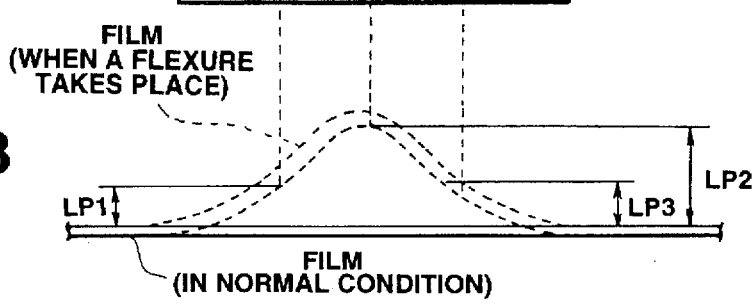
Figure 20:
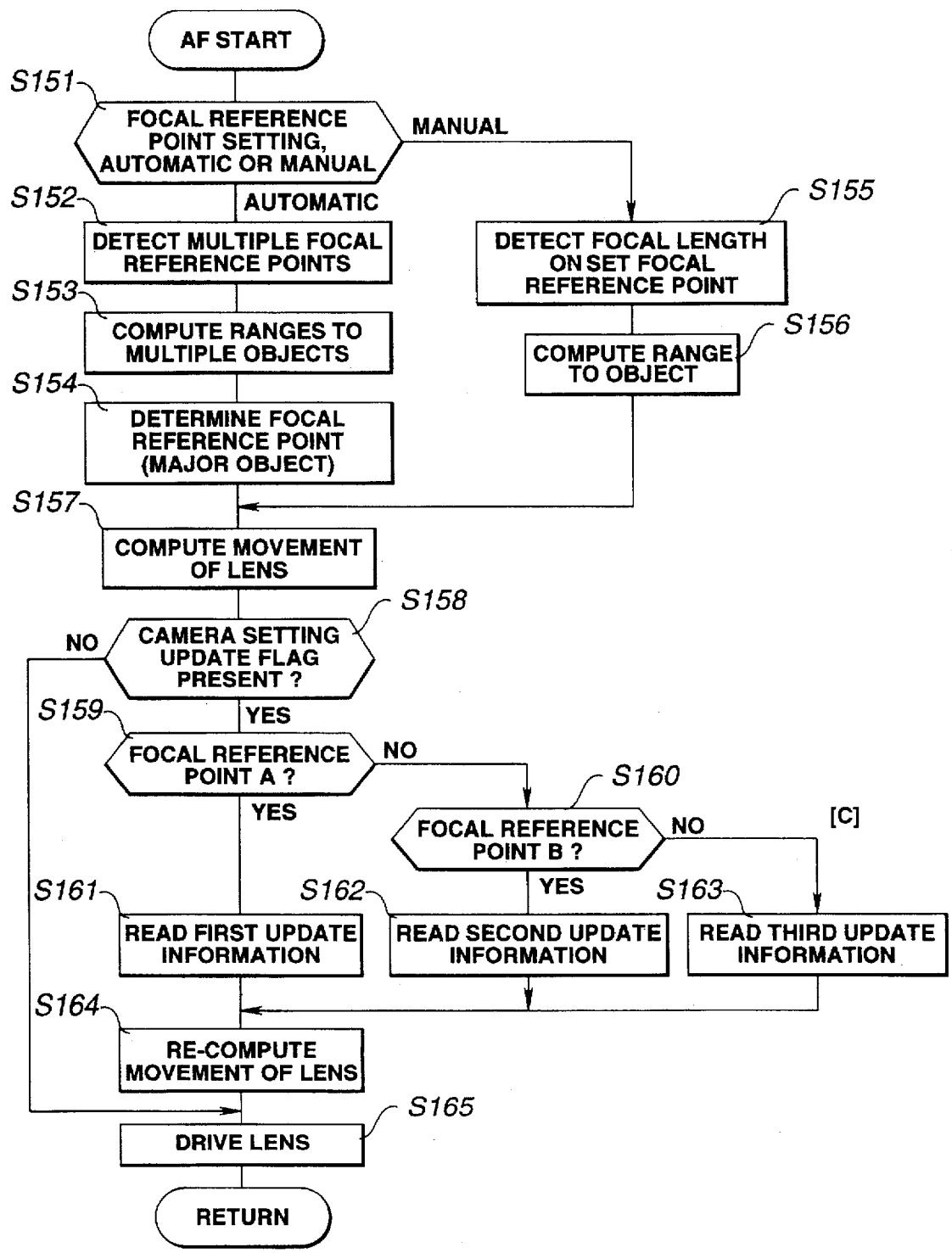
FIG. 20 is a flow diagram showing the operation of the configuration of FIG. 18.

Referring to FIGS. 18 through 20, the operation of another embodiment of the subroutine "AF" is now described with reference to FIG. 12. The operation identical to that in FIGS. 5 and 12 is not discussed again.

FIG. 18 is the block diagram, and shows major components in comparison with FIG. 5 for convenience of explanation. The difference from FIG. 5 is that the update information memory block 10 is replaced with three update information memory blocks, namely a first update information memory block 43, a second update information memory block 44, and a third update information memory block 45.

FIG. 19A shows the relationship between a photographic frame and focal reference points. Designated 38 is the photographic frame having focal reference points A through C on it. The focal reference points A through C are selected by the focal reference point selection block 15 in FIG. 18, or are positioned by the control block of the camera which automatically discriminate between objects for a major one based on the range to objects and photometric results.

Referring to the flow diagram in FIG. 20, the operation of the configuration in FIG. 18 is now discussed. The basic operation of the flow diagram herein agrees with the flow diagram in FIG. 12.

A determination is made of whether the setting of the focal reference points (positions) is automatic (left to the camera) or manual (set up by the focal reference point selection block 15) (step S151). If the setting is automatic, the sequence goes to step S152. If the setting is manual, the sequence goes to step S155. The range to object computing block 26 detects focus at each of the focal reference points B39, A40, and C41 (step S152).

The range to object computing block 26 computes the ranges to the objects at the focal reference points B39, A40, and C41 (step S153). The position of the major object is estimated based on the range to object computation results at step S153 and photometric results, and a focal reference point (position) is determined. The sequence goes to step S157 (step S154).

When the setting of the focal reference points (positions) is found to be manual at step S151, the focus detection block 37 performs focal length detection at the focal reference point set up by the focal reference point selection block 15 (step S155). The range to object computing block 26 computes the range to object based on the focal length detection results at the focal reference point where the focal length detection is performed at step S155. The sequence goes to step S157 (step S156).

Based on the range to object information obtained at step S154 or S156, the lens movement setting K(A) (identical to that in the equation (1)) of the focusing lens 20 is computed (step S157). A determination is made of whether there is a camera setting update enable flag or not. The camera setting update enable flag is set as required at step S24 in FIG. 6. If there is no camera setting update enable flag, the sequence goes to step S165, because lens driving is performed in principle according to the lens movement setting K(A) determined at step S157.

If there is a camera setting update enable flag at step S158, the sequence goes to step S159. A determination is made of whether the focal reference point (position) where lens movement computation is made at step S155 is point A (step S159). The point A denotes the focal reference point A40 in FIG. 19A. If the focal reference point (position) is the point A, the sequence goes to step S161. If not, the sequence goes to step S160.

At step S160, CPU 9 determines whether the focal reference point (position) where the lens movement computation is made at step S155 is point B. The point B denotes the focal reference point B39. If the focal reference point (position) is the point B, the sequence goes to step S162. If not, the sequence goes to step S163.

Now that the focal reference point (position) is found to be the point A at step S159, the camera setting update information stored in the first update information memory block 43 is read at step S161. The camera setting update information stored in the first update information memory block 43 is the information about the curling quantity of the film on the film plane corresponding to the focal reference point A40 in FIG. 19A. The value of the curling information is denoted as "LP2" in FIG. 19B, and the sequence goes to step S164.

Now that the focal reference point (position) is found to be the point B at step S160, the camera setting update information stored in the second update information memory block 44 is read at step S162. The camera setting update information stored in the second update information memory block 44 is the information about the curling quantity of the film on the film plane corresponding to the focal reference point B39 in FIG. 19A. The value of the curling information is denoted as "LP1" in FIG. 19B.

The sequence goes to step S164. Now that the focal reference point (position) is found to be the point C at step S160, the camera setting update information stored in the third update information memory block 45 is read at step S163. The camera setting update information stored in the third update information memory block 45 is the information about the curling quantity of the film on the film plane corresponding to the focal reference point C41 in FIG. 19A. The value of the curling information is denoted as "LP3" in FIG. 19B. The sequence then goes to step S164.

If the curling of the film has a cone-like shape with its peak at the focal reference point A40 on the center of the frame 38 in FIG. 19A, the curling quantity "LP1" on the film plane corresponding to the focal reference point B39 and the curling quantity "LP3" on the film plane corresponding to the focal reference point C41 are equal to each other. Recomputation of the lens movement setting to be described later is performed using the camera setting update information stored in one information memory block.

At step S164, the lens movement setting K(A)' offsetting the curling of the film is recomputed based on the camera setting update information read at steps S161 through S163.

K(A)' is based on the already-described equation (2). At step S165, the lens driving block 7 drives the focusing lens 20 according to the lens movement settings K(A) or K(A)' determined at preceding steps S157 or S164, respectively.

Described above is the projection operation of the focusing lens in which the curling of the film is compensated for using the focal reference points (positions). In this embodiment, the three-point AF method is employed. The present invention is not limited to this. The present invention is applied to a camera which employs a five-point AF method or which has focal reference points (positions) that are vertically arranged in the direction perpendicular to the direction of the film advance. An essential requirement is that the information indicative of the curling quantities of the film on the film plane corresponding to focal reference points (positions) be stored so that these pieces of stored information are used as necessary with a differentiation therebetween.

Figure 21:
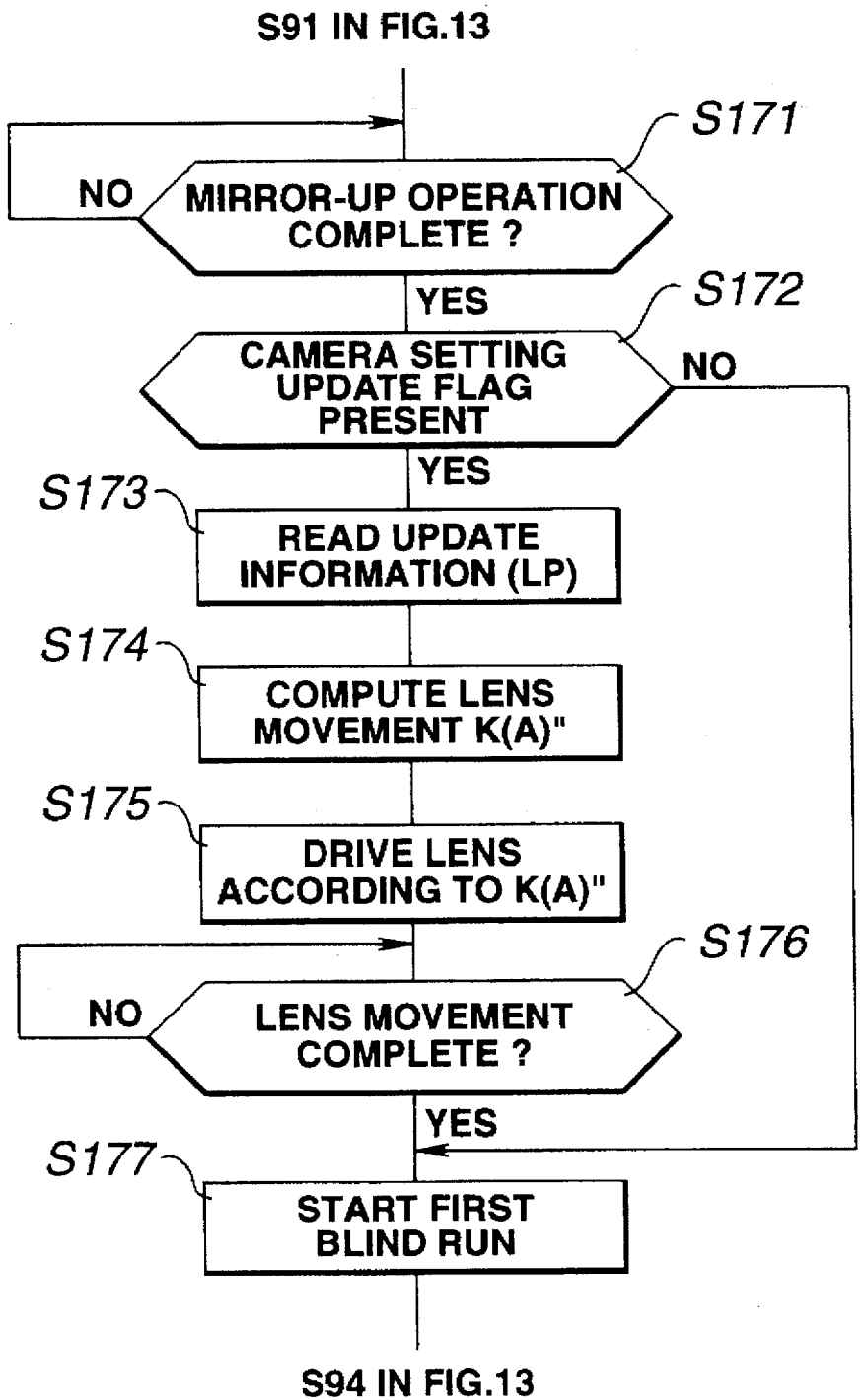
FIG. 21 is a flow diagram showing another embodiment of the subroutine "Exposure" of FIG. 13.
Figure 22:
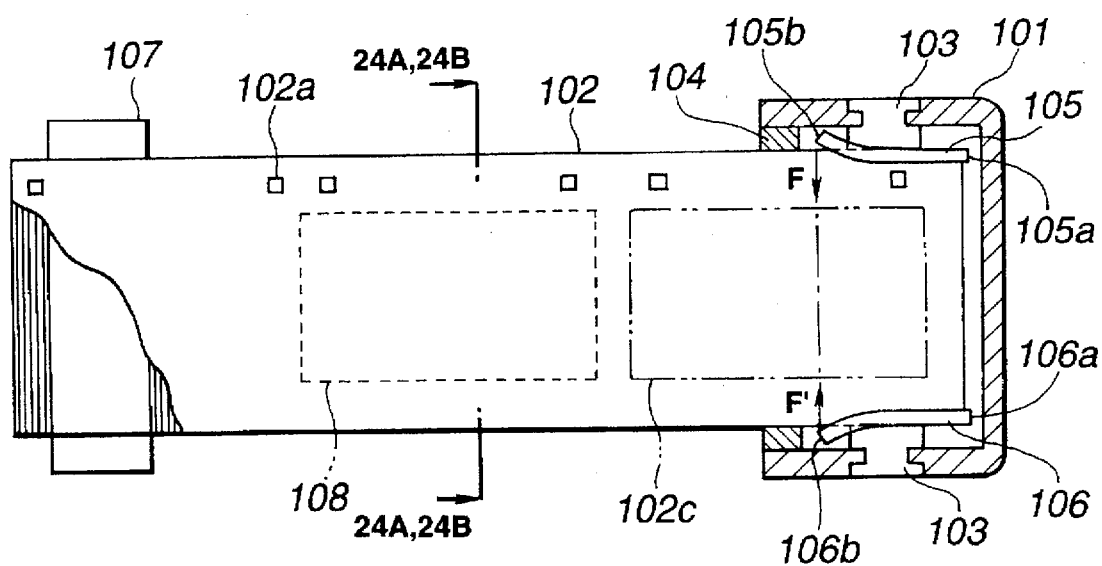
FIG. 22 is a cross-sectional view showing the condition of the film with the cartridge loaded in the camera of the related art.
Figure 23A:
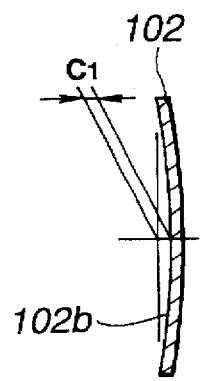
FIGS. 23A and 23B are the cross-sectional views across the film 102 of FIG. 22.
Figure 23B:
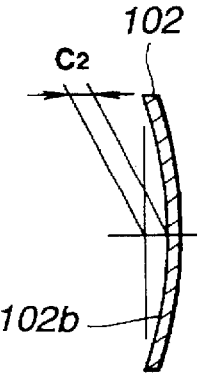

Referring to the flow diagram in FIG. 21, the operation of another embodiment of the subroutine "exposure" in FIG. 13 is discussed. The operation of this embodiment is partly common to that in FIG. 13, and its main steps are discussed. This embodiment is characterized in that the above-described compensation of the curling of the film by updating the lens movement setting is performed as necessary after a second release operation of the camera rather than at a first release operation in which normal lens driving is performed.

In succession to step S91 in FIG. 13, at step S171, a determination is made of whether the mirror-up operation of the mirror 25 is complete. CPU 9 repeats this step until the mirror-up operation is complete.

A determination is made of whether there is a camera setting update enable flag (step S172). The camera setting update enable flag is set as required at step S24 in FIG. 6. If there is no camera setting update enable flag, the sequence goes to step S177 to be described later, because, in principle, the lens can remain at the condition set at the first release operation of the camera.

If there is a camera setting update enable flag, the sequence goes to step S173 to drive (additionally) the lens to compensate for the curling of the film. The camera setting update information LP stored in the update information memory block 10 in FIG. 5 is read (step S173). Based on the read information, the lens movement setting K(A)" offsetting the curling of the film is computed (step S174). This K(A)" is based on the above-described equations (1) and (2). The normal lens movement setting K(A)=f×f/L is already driven, and thus the remainder LP in the equation (2) needs to be driven. Namely, K(A)"=LP.

Based on K(A)" computed at step S174, the lens driving is performed (step S175). At step S176, an unshown lens position detection block or the like determines whether the lens starting moving at step S175 has moved a distance K(A)". If the lens has not yet fully moved, this step is repeated until the lens driving is complete. If the lens driving is complete, the first blind run of the shutter unit 27 starts at step S177. The steps thereafter remain identical to step S94 thereafter in FIG. 13.

In the operation in FIG. 21, the driving of the focusing lens 20 at the first release switch operation does not consider the curling of the film. Thus, the camera offers an in-focus image to the photographer, when he observes it in a viewfinder. Then, the lens driving compensating for the curling of the film is additionally performed after the object image disappears from the viewfinder after the mirror-up operation. This arrangement compensates for the curling of the film without giving a false impression that an out-of-focus picture is being taken.

As described above, according to the present invention, based on the a time interval between the film feed actions or a time interval between power switch operations, an influence on imaging performance caused by the curling of the film due to the pressure between flanges in the cartridge is compensated for by updating the camera setting, such as the lens aperture value during photographing or the lens movement setting for image forming of an object.

A precise compensation is performed by providing memory means which stores update or compensation information to be used for compensating for an influence on imaging performance caused by the curling of the film due to the pressure between flanges in the cartridge. A precise compensation is also performed based the compensation information that is stored according to actual curling quantities of the film. The compensation is also performed based on the lengths between the flanges in the cartridge and the exposure opening (aperture).

To compensate for the curling of the film, compensation driving force is prohibited in accordance with the exposure settings during photographing so that the aperture value setting and the lens movement setting are free from unnecessary updating. The photographer thus achieves the exposure settings as he intends. During compensation, the aperture value only is updated in response to the exposure settings at photographing; thus, the camera needs no lens driving, capable of saving electric power while compensating for the influence of the curled film on imaging performance. Furthermore, during compensation, the lens movement setting only is updated in response to the exposure settings at photographing; thus, the camera is free from the unnecessary updating of the aperture value, capable of offering the exposure settings the photographer intends while compensating for the influence of the curled film on image performance.

During compensation, both the aperture value and the lens movement settings are updated in response to the exposure settings at photographing to offer the exposure settings the photographer intends and to compensate for a large degree of curling of the film. Memory means for storing the hold time information for a plurality of frames is provided to determine the presence or absence of the necessity for compensation with respect to each frame. During compensation, the camera setting update is performed according to the exposure mode of the camera so that the exposure settings are achieved as the photographer intends and the influence of curling of the film on imaging performance is compensated for.

During compensation, by updating the camera setting according to the selection condition of the focal reference points (positions) of the camera or the focal length condition or the hold time, the exposure settings are achieved as the photographer intends while the influence of the curling of the film on imaging performance is compensated for. During compensation, by updating the lens movement setting according to the selection condition of the focal reference points (positions), a picture well focused on the main object is taken. During compensation, the lens driving is performed between after the mirror-up operation of the camera and before the start of exposure, to compensate for the curling of the film, and the camera offers an in-focus image to the photographer, when he observes it in a viewfinder, and the influence of the curling of the film on imaging performance is compensated for.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A camera using a film cartridge that pays out a film with a load exerted partly on the film in a direction of a width of the film, comprising:

measuring means for counting a hold time during which the film is held at a halt state with the film cartridge loaded in the camera until a predetermined action is taken, and camera setting update means for updating a camera setting to prevent an improper exposure condition due to a curling of the film which is caused by a load exerted on the film in a direction of a width of the film when the film is in said halt state.

2. The camera according to claim 1, wherein said camera setting update means updates at least one of an aperture value setting and an imaging lens movement setting.

3. A camera using a film cartridge that holds a film with a load exerted on the film in a direction of a width of the film, comprising:

measuring means for counting a time between a last film feed action and a film feed action previous to said last film feed action, determining means for determining a state of curling of the film based on an output from the measuring means, and camera setting update means for updating a camera setting to prevent the occurrence of an improper exposure condition due to curling of the film caused by forces acting on the film in a direction of a width of the film when an output of said measuring means represents a curling quantity of the film which exceeds a predetermined value.

4. The camera according to claim 3, wherein said camera setting update means updates at least one of an aperture value setting and an imaging lens movement setting.

5. A camera using a film cartridge that holds a film with a load exerted on the film in a direction of a width of the film, comprising:

detection means for detecting whether a film winding operation for photographing has been performed, time information output means for outputting a time at which the detection means gives an output, time information memory means for storing the time outputted by the time information output means, computing means for computing a film hold time based on a latest time counted by the time information output means and a time stored by the time information memory means, and determining means for computing a deformation quantity of the film caused by the load exerted on the film in the direction of the width of the film based on a film hold time computed and determining whether or not an updating of a camera setting for use in photographing is required.

6. The camera according to claim 5, wherein the determining means comprises means for selecting and updating a camera setting when a determination reveals that updating of the camera setting is required.

7. A camera using a film cartridge that holds a film with a load exerted on the film in a direction of a width of the film, comprising:

a power switch for enabling or disabling operation of the camera, time information output means for outputting at least a time when the power switch gives an output, time information memory means for storing the time outputted by the time information output means, determining means for determining a film hold time by comparing a time at which operation of the camera was enabled, with a time at which the camera had been disabled before the camera was enabled and which is stored in the time information memory means, and camera setting update means for updating a camera setting for use in photographing to prevent occurrence of an improper exposure condition due a curling of the film caused by the load exerted on the film in the direction of the width of the film based on the film hold time.

8. The camera according to claim 7, wherein said camera setting update means updates at least one of an aperture value setting and an imaging lens movement setting.

9. A camera using a film cartridge that holds a film with a load exerted on the film m a direction of a width of the film, comprising:

time information output means for outputting a time at each photographing action of the camera, time information memory means for storing a time outputted by the time information output means, and camera setting update means for computing a film hold time based on a latest time counted by the time information output means and a time stored in the time information memory means, and updating a camera setting for use in photographing to prevent occurrence of an improper exposure condition due a curling of the film caused by the load exerted on the film in the direction of the width of the film based on the film hold time.

10. A camera using a film cartridge that holds a film with a load exerted on the film in a direction of a width of the film, comprising:

measuring means for measuring a hold time during which the film housed in the film cartridge loaded in the camera is held until initiation of a predetermined action, compensation information memory means for storing compensation information corresponding to a hold time, and determining means for determining, based on the compensation information, whether or not updating of a camera setting for use in photographing is required.

11. The camera according to claim 10, wherein said determining means comprises photographing condition compensation means which corrects a photographing condition when a determination by said determining means reveals that an update of the camera setting is required.

12. The camera according to claim 11, wherein said photographing condition compensation means comprises means for computing information representing curling of the film caused by the load exerted on the film in the direction of the width of the film.

13. The camera according to claim 11, wherein said photographing condition compensation means comprises means for selecting and updating the camera setting based on the information representing curling of the film caused by the load exerted on the film in the direction of the width of the film.

14. The camera according to claim 10, wherein said compensation information is information representing deformation of a load-affected portion of the film in a width direction and which is advanced to a position within an aperture opening of the camera after being held under a load in a vicinity of a film delivery port of the film cartridge.

15. A camera using a film cartridge that holds a film with a load exerted on the film in a direction of a width of the film, comprising:

time information output means for outputting time at each photographing action of the camera, time information memory means for storing a time outputted by the time information output means, and camera setting compensation means for computing a film hold time based on a latest time counted by the time information output means and a time stored in the time information memory means, and giving an instruction for providing one of updating a camera setting for use in photographing and inhibiting updating of the camera setting, based on the computed film hold time.

16. The camera according to claim 15, wherein said camera setting compensation means gives an instruction for one of updating, and inhibiting updating of, at least one of an aperture value setting and an imaging lens movement setting for use in photographing.

17. The camera according to claim 15, wherein compensation items of the camera setting compensation means include an item that is automatically selected according to an exposure mode of the camera that has predetermined exposure settings.

18. A camera using a film cartridge that holds a film with a load exerted on the film in a direction of a width of the film, comprising:

time information output means for outputting time at each film feed action of the camera, time information memory means for storing an output of said time information output means, determining means for determining whether a film hold time is within a predetermined time or not, based on a time at which a portion of the film on which the load was exerted in the direction of the width of the film in the film cartridge is advanced, and a time stored in the time information memory means, and camera setting update means for updating a camera setting for use in photographing to prevent an improper exposure condition due to curling of the film caused by the load exerted on the film in the direction of the width of the film when a determination of said determining means reveals that the hold time exceeds the predetermined time and when the portion of the film that was under an influence of the load in the direction of the width of the film is advanced to an exposure opening in said camera.

19. A camera using a film cartridge that holds a film with a load exerted on the film in a direction of a width of the film, comprising:

a power switch for enabling or disabling operation of the camera, time information output means for outputting time each time the power switch is operated, time information memory means for storing the output from the time information output means, determining means for determining whether a film hold time is within a predetermined time or not, based on a time at which a portion of the film on which the load was exerted in the direction of the width of the film in the film cartridge is advanced, and a time stored in the time information memory means, and camera setting update means for updating a camera setting for use in photographing to prevent an improper exposure condition due to curling of the film caused by the load exerted on the film in the direction of the width of the film when a determination of said determining means reveals that the hold time exceeds the predetermined time and when a portion of the film that was under an influence of the load in the direction of the width of the film is advanced to an exposure opening in the camera.

20. A method for operating a camera which uses a film cartridge that feeds a film across a photographing aperture in the camera, said film cartridge exerting forces on the film in a direction of a width of the film which can cause the film to curl, said method comprising the steps of:

(a) measuring an elapsed time between a last feeding of film from an in/out port of the film cartridge and a present request for a camera operation; and (b) modifying a camera setting for use during photographing based upon an elapsed time measured during step (a) to compensate for film curling.

21. The method of claim 20 wherein step (a) further comprises determining an amount of curling of the film in the width direction due to said forces based upon a measurement of the elapsed time and wherein step (b) further comprises adjusting a camera setting based upon the amount of curling determined.

22. The method of claim 20 wherein step (b) further comprises modifying at least one of an aperture setting and a focusing of a taking lens based on the elapsed time measurement obtained in step (a).

23. The method of claim 20 wherein step (a) further comprises storing data representative of a time when film feeding from the cartridge is stopped;

continuously counting elapsed time; and determining a difference between a count of elapsed time and a count stored responsive to a request for a camera operation.

24. The method of claim 20 wherein a camera operation in step (a) consists of one of a turning on of the camera, advancing film in the camera toward the exposure opening and initiating a photographing operation.

25. The method of claim 20 wherein said camera is capable of being turned on and turned off and wherein step (a) further comprises continuously counting an elapsed time regardless of whether the camera is turned on or turned off;

turning off the camera and storing a count representative of a time when the camera is turned off; and turning on the camera and comparing the elapsed time and the stored count to obtain a difference value responsive to the camera being turned on.

26. The method of claim 20 wherein step (b) further comprises storing a predetermined elapsed time value;

comparing the measured amount with said stored elapsed time value; and adjusting a camera setting only when said elapsed time value is greater than said stored amount.

27. The method of claim 20 wherein step (b) further comprises storing a first count representative of a first elapsed time amount T1;

storing a count representative of a second elapsed time amount T2 wherein T2 is greater than T1;

comparing the measured elapsed time against elapsed time T1 and elapsed time T2 and performing one of the following steps:
(i) leaving present camera settings unchanged when the measured elapsed time is less than T1;
(ii) adjusting only one setting of a group of camera settings when the measured elapsed time is greater than T1 and less than T2; and
(iii) adjusting at least two settings of the group of camera settings when the measured elapsed time is greater than T2.

28. A method for operating a camera which uses a film cartridge that feeds a film across a photographing aperture, said film cartridge exerting forces on the film in a direction of a width of the film, said method comprising the steps of:
   (a) measuring an elapsed time between a last feeding of film from an in/out port of the film cartridge and a present request for a camera operation;
   (b) establishing focal points at a plurality of positions occupied by a film which extends across a photographing aperture in the camera;
   (c) storing update data for each of said points which data are a function of an amount of curling experienced at each point by a film due to said forces during a non-winding state of the film;
   (d) measuring a distance between the camera and each of a plurality of objects within an image field which are located at said points;
   (e) selecting one of the measured distance representing a major object as a reference point; and
   (f) determining if the stored information for the associated reference point corresponding to said reference point requires modification based on the measured distance of said reference point.

29. A method for operating a camera having an on/off switch and the unit for continually measuring elapsed time regardless of whether the camera is turned on or off by the on/off switch and which uses a film cartridge that feeds the film across the photographing aperture in the camera, said film cartridge exerting forces on the film in a direction of a width of the film, which forces can cause curling of the film, said method comprising steps of:
   (a) turning the camera off and detecting when the on/off switch is operated to turn the camera off;
   (b) storing a value of the elapsed time representing the time that the camera has been turned off;
   (c) turning the camera on and detecting when the on/off switch has been operated thereafter to turn the camera on;
   (d) storing a value of an elapsed time representative of the time that the camera has been turned on;
   (e) determining a difference between the values stored during steps (b) and (d); and
   (f) modifying a camera setting for use during photographing based on the difference value determined during step (e) to compensate for film curling.

30. A camera using a film cartridge that holds a film with a load exerted on the film in a direction of a width of the film, comprising:
   detection means for detecting whether a film winding operation for photographing has been performed;
   time information output means for outputting a time at which the detection means gives an output;
   time information memory means for storing a time outputted by the time information output means;
   computing means for computing a film holding time based on a latest time counted by the time information output means and a time stored by the time information memory means;
   determining means for computing a deformation quantity of the film caused by the load exerted on the film in the direction of the width of the film based on a film hold time computed and determining whether or not an updating of a camera setting is required; and
   means for selecting a proper camera setting based on the deformation quantity of the film caused by the load exerted on the film in the direction of the width of the film when the determination of said determining means reveals that an update of the camera setting is required.

* * * * *